US012124193B2

(12) United States Patent
Kurosu

(10) Patent No.: US 12,124,193 B2
(45) Date of Patent: Oct. 22, 2024

(54) IMAGE FORMING APPARATUS HAVING PRESSING MEMBER

(71) Applicant: CANON KABUSHIKI KAISHA, Tokyo (JP)

(72) Inventor: Toshiyuki Kurosu, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/192,482

(22) Filed: Mar. 29, 2023

(65) Prior Publication Data

US 2023/0341796 A1 Oct. 26, 2023

(30) Foreign Application Priority Data

Apr. 22, 2022 (JP) ................................ 2022-071198

(51) Int. Cl.
*G03G 15/16* (2006.01)

(52) U.S. Cl.
CPC ................................ *G03G 15/1615* (2013.01)

(58) Field of Classification Search
CPC ....................... G03G 15/1615; G03G 15/6558
See application file for complete search history.

(56) References Cited

U.S. PATENT DOCUMENTS

2022/0197201 A1* 6/2022 Kitago ............... G03G 15/1615

FOREIGN PATENT DOCUMENTS

JP H0980926 A 3/1997

* cited by examiner

*Primary Examiner* — Sophia S Chen
(74) *Attorney, Agent, or Firm* — Canon U.S.A., Inc. IP Division

(57) ABSTRACT

An image forming apparatus includes an image forming unit, a belt, tension rollers, a pressing member, a support member, and an adjustment member. The pressing member is brought into contact with an inner circumferential surface of the belt and, from the inner circumferential surface, presses the belt against an outer circumferential surface of the belt and extending along a longitudinal direction corresponding to a width direction of the belt. A tip of the pressing member is brought into contact with the inner circumferential surface. The adjustment member is fixed such that a position with respect to the pressing member is adjustable in a short direction orthogonal to a longitudinal direction of the pressing member, and adjusts a length of a protruding portion of the pressing member protruding from the adjustment member toward the downstream in a movement direction of the belt.

14 Claims, 11 Drawing Sheets

IMAGE FORMING APPARATUS HAVING PRESSING MEMBER

BACKGROUND

Field

The present disclosure relates to an image forming apparatus, such as a printer, a printing machine, a copying machine, a facsimile apparatus, or a multifunction peripheral including a plurality of functions thereof, using an electrophotographic method or an electrostatic recording method.

Description of the Related Art

Some of image forming apparatuses that use an electrophotographic method or the like include a rotatable endless belt (hereinafter, also simply referred to as a "belt") serving as an image carrying member that carries and conveys a toner image. As such a belt, for example, there is an intermediate transfer belt serving as a second image carrying member that conveys the toner image primarily transferred from a photosensitive member or the like serving as a first image carrying member to secondarily transfer the toner image onto a sheet-like recording material such as paper. Hereinafter, an image forming apparatus employing an intermediate transfer system including such an intermediate transfer belt is mainly described as an example.

In the image forming apparatus that uses the intermediate transfer belt, a toner image formed on a photosensitive member or the like in an image forming unit is primarily transferred onto the intermediate transfer belt at a primary transfer portion. The toner image primarily transferred onto the intermediate transfer belt is secondarily transferred onto a recording material at a secondary transfer portion. An inner member (inner secondary transfer member) provided on an inner circumferential surface of the intermediate transfer belt, and an outer member (outer secondary transfer member) provided on an outer circumferential surface of the intermediate transfer belt constitute the secondary transfer portion serving as a contact portion between the intermediate transfer belt and the outer member. An inner secondary transfer roller, which is one of a plurality of tension rollers around which the intermediate transfer belt is stretched, is used as the inner member. As the outer member, an outer secondary transfer roller is often used. The outer secondary transfer roller is located at a position opposed to the inner secondary transfer roller with the intermediate transfer belt interposed therebetween and is pressed against the inner secondary transfer roller. A voltage with a polarity opposite to a charging polarity of toner is applied to the outer secondary transfer roller or a voltage with the same polarity as the charging polarity of toner is applied to the inner secondary transfer roller, and thereby the toner image formed on the intermediate transfer belt is secondarily transferred onto a recording material at the secondary transfer portion. The term "leading edge" refers to the leading edge of the recording material in a conveyance direction of the recording material, and the term "trailing edge" refers to the trailing edge of the recording material in the conveyance direction of the recording material. An upstream of the secondary transfer portion in a rotational direction of the intermediate transfer belt is also simply referred to as, for example, the "upstream of the secondary transfer portion".

To accurately transfer the toner image formed on the intermediate transfer belt onto a recording material, a contact length between the intermediate transfer belt and the recording material in the rotational direction of the intermediate transfer belt at the upstream of the secondary transfer portion plays an important role. If the contact length is long, an image defect or the like can be caused by sliding friction between toner and the recording material due to a difference in speed between the intermediate transfer belt and the recording material. In contrast, if the contact length is short, an image defect or the like can be caused by electric discharge occurring in an airspace between the recording material and the intermediate transfer belt. Thus, the conveyance orientation of the recording material and the stretch layout of the intermediate transfer belt are determined in consideration of, for example, a contact position of the leading edge of the recording material on the intermediate transfer belt at the upstream of the secondary transfer portion.

Japanese Patent Application Laid-Open No. H09-80926 discusses a structure including a planarity correction member that is provided at the upstream of a contact position (tacking position) of the leading edge of a recording material with respect to an intermediate transfer belt in the rotational direction of the intermediate transfer belt and presses the intermediate transfer belt while being in contact with the inner circumferential surface of the intermediate transfer belt. The structure discussed in Japanese Patent Application Laid-Open No. H09-80926 uses a flexible baffle plate or an elastic roll as the planarity correction member.

As described above, the pressing member (backup member) is brought into contact with the inner circumferential surface of the intermediate transfer belt at the upstream of the secondary transfer portion, thereby making it possible to control the shape (orientation) of the intermediate transfer belt at the upstream of the secondary transfer portion to be a predetermined shape (orientation). In such a structure, for example, a flexible resin material is used as a material for the pressing member. To appropriately set the contact length between the intermediate transfer belt and the recording material, the inner circumferential surface of the intermediate transfer belt at the downstream of the secondary transfer portion is pressed down by the pressing member and the intermediate transfer belt is deformed to thereby form the appropriate shape (orientation) of the intermediate transfer belt. This makes it possible to prevent the occurrence of an image defect caused by electric discharge and an image defect caused by frictional sliding between the recording material and toner on the intermediate transfer belt when the pressing member is located near the secondary transfer portion.

However, flexible resin materials are not often used under load, and thus the thickness and Young's modulus of the resin materials vary greatly. For example, a variation of ±0.07 mm is observed in a polyethylene terephthalate (PET) material formed of a resin material with a thickness 0.5 mm, and a variation in Young's modulus of 1000 to 2000 MPa is observed in actual measurement. For example, when the thickness and Young's modulus of a resin material become negative with respect to a nominal value, the contact position of the pressing member on the intermediate transfer belt varies. Further, as a force with which the pressing member presses the inner circumferential surface of the intermediate transfer belt decreases, the deformation amount of the intermediate transfer belt due to pressing of the pressing member at the upstream of the secondary transfer portion decreases. As a result, the contact length between the intermediate transfer belt and the recording material at the upstream of the secondary transfer portion decreases and the airspace formed between the intermediate transfer belt and the recording material increases, which may cause an image defect due to electric discharge.

A conventional issue has been described above using, as an example, the secondary transfer portion serving as a transfer portion to transfer a toner image from the intermediate transfer belt onto a recording material. A similar issue can also be caused in a transfer portion to transfer a toner image from another belt-like image carrying member, such as a photosensitive member, onto a recording material.

In this regard, it is possible to reduce variations in apparent individual difference of the pressing member by adjusting a free length of the pressing member. However, in this case, the position of the distal end of the pressing member with respect to the intermediate transfer belt varies, which makes it difficult to adjust the deformation amount of the intermediate transfer belt due to pressing of the pressing member at the upstream of the secondary transfer portion to a desired value.

SUMMARY

The present disclosure is directed to providing an image forming apparatus capable of suppressing variations in the deformation amount of a belt due to pressing of a pressing member, without changing the position of the pressing member with respect to a support member even when the thickness or Young's modulus of the material of the pressing member varies from a nominal value.

According to an aspect of the present disclosure, an image forming apparatus includes an image forming unit configured to form a toner image, a belt that is rotatable and endless and configured to receive transfer of the toner image formed by the image forming unit, a plurality of tension rollers around which the belt is stretched, wherein the plurality of tension rollers includes an inner roller and an upstream roller where the inner roller forms a transfer portion to transfer the toner image from the belt onto a recording material and the upstream roller is located in adjacent to the inner roller at an upstream of the inner roller in a rotational direction of the belt, a pressing member having a tip and located at the upstream of the inner roller and at a downstream of the upstream roller in the rotational direction of the belt, wherein the pressing member is configured to be brought into contact with an inner circumferential surface of the belt and, from the inner circumferential surface of the belt, to press the belt against an outer circumferential surface of the belt and extending along a longitudinal direction corresponding to a width direction of the belt, and the tip of the pressing member is configured to be brought into contact with the inner circumferential surface of the belt, a support member configured to support the pressing member, and an adjustment member provided between the pressing member and the support member, wherein the adjustment member is fixed such that a position with respect to the pressing member is adjustable in a short direction orthogonal to a longitudinal direction of the pressing member, and is configured to adjust a length of a protruding portion of the pressing member protruding from the adjustment member toward the downstream in a movement direction of the belt.

Further features of the present disclosure will become apparent from the following description of exemplary embodiments with reference to the attached drawings.

DESCRIPTION OF THE EMBODIMENTS

An image forming apparatus according to an exemplary embodiment of the present disclosure will be described in detail below with reference to the drawings.

1. Overall Structure and Operation of Image Forming Apparatus

Figure 1:
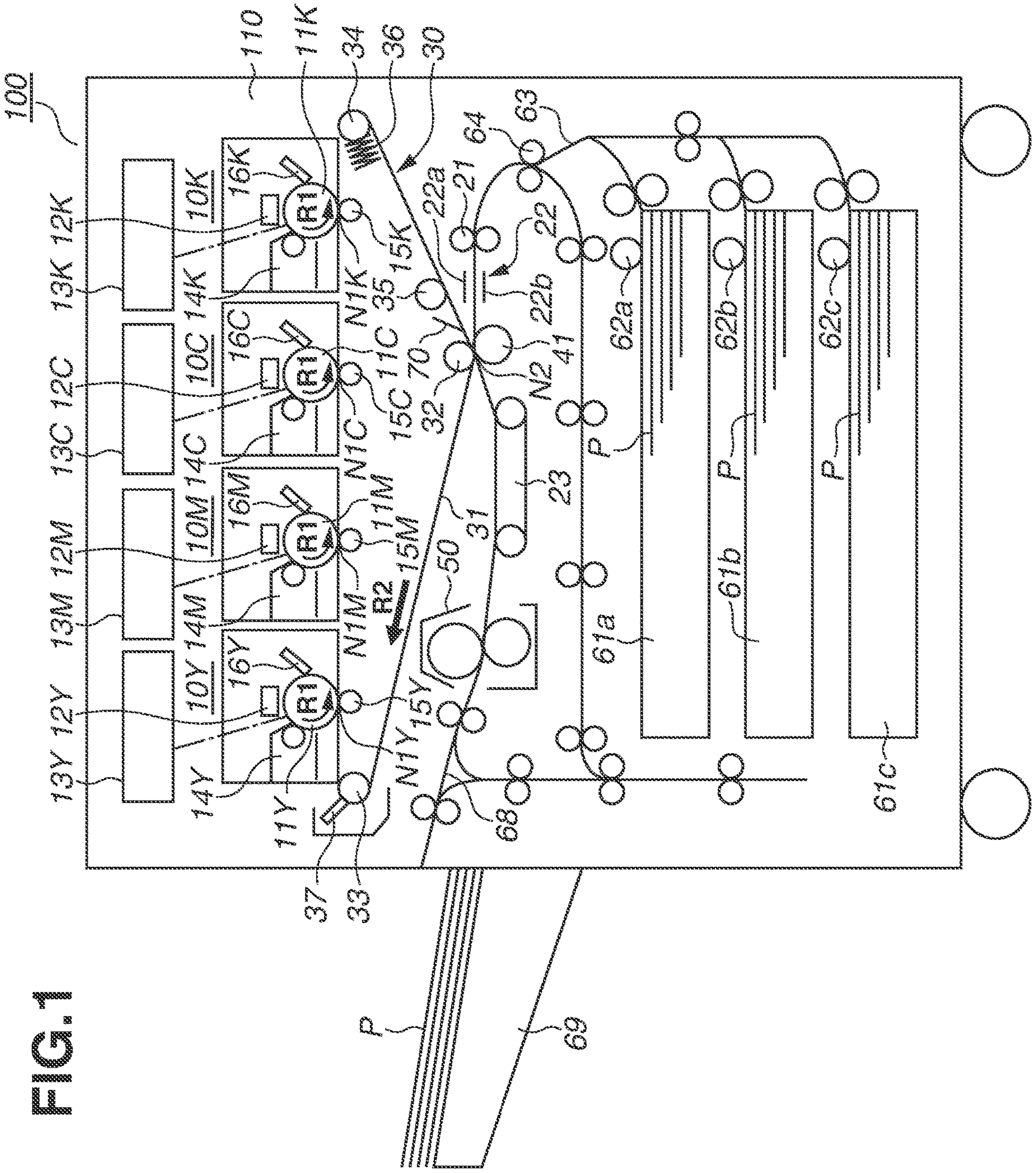
FIG. 1 is a schematic sectional view of an image forming apparatus according to an exemplary embodiment.

FIG. 1 is a schematic sectional view of an image forming apparatus 100 according to a first exemplary embodiment. The image forming apparatus 100 according to the first exemplary embodiment is a tandem printer that employs an intermediate transfer method. The image forming apparatus 100 is configured to form a full-color image on a sheet-like recording material (a transfer material, a sheet, a recording medium, or media) P, such as paper, using an electrophotographic method, for example, based on image signals transmitted from an external apparatus, such as a personal computer.

The image forming apparatus 100 includes four image forming units 10Y, 10M, 10C, and 10K that form images of yellow (Y), magenta (M), cyan (C), and black (K), respectively, as a plurality of image forming units (stations). The image forming units 10Y, 10M, 10C, and 10K are aligned along a movement direction of an image transfer surface located substantially horizontally on an intermediate transfer belt 31 to be described below. Elements including functions or configurations identical or corresponding to those of the image forming units 10Y, 10M, 10C, and 10K are comprehensively described by omitting symbols Y, M, C, and K that are added to reference numerals indicating the elements for the respective colors. In the present exemplary embodiment, an image forming unit 10 (10Y, 10M, 10C, 10K) includes a photosensitive drum 11 (11Y, 11M, 11C, 11K), a charging device 12 (12Y, 12M, 12C, 12K), an exposure device 13 (13Y, 13M, 13C, 13K), a developing device 14 (14Y, 14M, 14C, 14K), a primary transfer roller 15 (15Y, 15M, 15C, 15K), and a cleaning device 16 (16Y, 16M, 16C, 16K), as described below.

The image forming apparatus 100 includes the photosensitive drum 11 that is rotatable drum-shaped (cylindrical) photosensitive members (electrophotographic photosensitive members) serving as a first image carrying member that carries a toner image. A driving force is transmitted to the photosensitive drum 11 from a drum driving motor (not illustrated) serving as a driving source. The photosensitive drum 11 is rotationally driven at a predetermined circumferential velocity (process speed) in a direction indicated by an arrow R1 (counterclockwise) in FIG. 1. The surface of the rotating photosensitive drum 11 is uniformly charged to a predetermined potential with a predetermined polarity (negative polarity in the present exemplary embodiment) by the charging device 12 serving as a charging unit. During the charging process, a predetermined charging voltage (charging bias) is applied to the charging device 12 by a charging power supply (not illustrated).

The charged surface of the photosensitive drum 11 is scanned and exposed to light based on image signal by the exposure device 13 serving as an exposure unit, so that an electrostatic image (electrostatic latent image) is formed on the surface of the photosensitive drum 11. In the present exemplary embodiment, the exposure device 13 is configured as a laser scanner device that applies laser light modulated based on image signal (image information) to the surface of the photosensitive drum 11. The developing device 14 serving as a developing unit supplies toner as developer to develop (visualize) the electrostatic image formed on the surface of the photosensitive drum 11, thereby forming a toner image (developer image) on the surface of the photosensitive drum 11. In the present exemplary embodiment, toner charged to the same polarity (negative polarity in the present exemplary embodiment) as the charging polarity of the photosensitive drum 11 adheres to an exposure portion (image portion) on the photosensitive drum 11 where the absolute value of the potential has decreased during the exposure process after the uniform charging process (reversal developing method). During the development process, a development power supply (not illustrated) applies a predetermined developing voltage (developing bias) to a developing roller serving as a developer carrying member included in the developing device 14. In the present exemplary embodiment, the negative polarity is the normal charging polarity of toner that is the main charging polarity of toner during the development process.

The intermediate transfer belt 31 that is a rotatable intermediate transfer member formed of an endless belt and serving as the second image carrying member to carry the toner image is opposed to four photosensitive drums 11Y, 11M, 11C, and 11K. The intermediate transfer belt 31 is suspended around a driving roller 33, a tension roller 34, a pre-secondary transfer roller 35, and an inner secondary transfer roller 32, all of which are serving as a plurality of tension rollers (support rollers), and is stretched by a predetermined tension (tensile force). The driving roller 33 transmits a driving force to the intermediate transfer belt 31. The driving roller 33 is rotationally driven by the driving force transmitted from a belt driving motor (not illustrated) serving as the driving source. Thus, the driving force input from the driving roller 33 allows the intermediate transfer belt 31 to rotate (revolve) in a direction indicated by an arrow R2 (clockwise) in FIG. 1 at a circumferential velocity (process speed) corresponding to the circumferential velocity of the photosensitive drum 11. The tension roller 34 applies a predetermined tension to the intermediate transfer belt 31, thereby controlling the tension of the intermediate transfer belt 31 to be constant. The tension roller 34 is urged against the outer circumferential surface of the intermediate transfer belt 31 from the inner circumferential surface thereof using a tension spring 36 formed of a compression coil spring that is an urging member serving as a tension applying unit (urging unit) at both ends in a rotational axis direction of the tension roller 34. The pre-secondary transfer roller 35 forms the surface of the intermediate transfer belt 31 in the vicinity of the upstream of a secondary transfer portion N2 (to be described below) in the rotational direction (surface movement direction) of the intermediate transfer belt 31. In the present exemplary embodiment, the inner secondary transfer roller (inner member) 32 functions as a secondary transfer member serving as a secondary transfer unit. On the inner circumferential surface of the intermediate transfer belt 31, the primary transfer rollers 15Y, 15M, 15C, and 15K, which are roller-shaped primary transfer members each serving as a primary transfer unit, are located at positions corresponding to the photosensitive drums 11Y, 11M, 11C, and 11K, respectively. In the present exemplary embodiment, the primary transfer roller 15 is located at the position opposed to the photosensitive drum 11 via the intermediate transfer belt 31. The primary transfer roller 15 presses the intermediate transfer belt 31 against the photosensitive drum 11, thereby forming a primary transfer portion (primary transfer nip) N1 as a contact portion between the photosensitive drum 11 and the intermediate transfer belt 31. The tension rollers other than the driving roller 33 of the plurality of tension rollers and the primary transfer rollers 15 are driven and rotated along with the rotation of the intermediate transfer belt 31. On the inner circumferential surface of the intermediate transfer belt 31, a pressing member 70 is provided at the upstream of the inner secondary transfer roller 32 and at the downstream of the pre-secondary transfer roller 35 in the rotational direction of the intermediate transfer belt 31. The pressing member 70 will be described in detail below.

As described above, the toner image formed on the surface of the photosensitive drum 11 is primarily transferred onto the surface of the rotating intermediate transfer belt 31 at a primary transfer portion N1 (N1Y, N1M, N1C, N1K). During the primary transfer process, a primary transfer power supply (not illustrated) applies a primary transfer voltage (primary transfer bias) that is a direct-current (DC) voltage with a polarity opposite to the normal charging polarity (positive polarity in the present exemplary embodiment) of toner to the primary transfer roller 15. For example, during formation of a full-color image, yellow, magenta, cyan, and black toner images formed on the respective photosensitive drums 11 are sequentially primarily transferred onto the same image forming area on the intermediate transfer belt 31 in a superimposed manner. In the present exemplary embodiment, the primary transfer portion N1 corresponds to an image forming position where the toner images are formed on the surface of each intermediate transfer belt 31. The intermediate transfer belt 31 is an example of a rotatable endless belt that conveys the toner images carried at the image forming position.

On the outer circumferential surface of the intermediate transfer belt 31, an outer secondary transfer roller (outer member) 41 is located at a position opposed to the inner secondary transfer roller 32. In the present exemplary embodiment, the outer secondary transfer roller 41 functions as an opposed member (opposed electrode) of the inner secondary transfer roller 32. The outer secondary transfer roller 41 is pressed against the inner secondary transfer roller 32 via the intermediate transfer belt 31, thereby forming the secondary transfer portion (secondary transfer nip) N2 as a contact portion between the intermediate transfer belt 31 and the outer secondary transfer roller 41. As described above, the toner image formed on the intermediate transfer belt 31 is secondarily transferred onto a recording material P that is nipped and conveyed between the intermediate transfer belt 31 and the outer secondary transfer roller 41 at the secondary transfer portion N2. In the present exemplary embodiment, during the secondary transfer process, a secondary transfer power supply (not illustrated) applies a secondary transfer voltage (secondary transfer bias) that is a DC voltage with the same polarity (negative polarity in the present exemplary embodiment) as the normal charging polarity of toner to the inner secondary transfer roller 32. In the present exemplary embodiment, the outer secondary transfer roller 41 is electrically grounded (connected to the ground). The outer secondary transfer roller 41 can be used as the secondary member to apply the secondary transfer voltage with a polarity opposite to the normal charging polarity of toner, and the inner secondary transfer roller 32 can be used as the opposed electrode to be electrically grounded.

Recording materials P are stored in recording material cassettes 61*a*, 61*b* and 61*c* each serving as a recording material storage portion.

Any one of sheet feed rollers 62*a* to 62*c* that are sheet feed members each serving as a sheet feed unit is rotationally driven to thereby feed the recording material P stored in the corresponding one of the recording material cassettes 61*a* to 61*c* to a sheet feed conveyance path 63. This recording material P is conveyed to a registration roller pair 21, which is a conveyance member serving as a conveyance unit, by a conveyance roller pair 64 or the like, which is a conveyance member serving as a conveyance unit, and is temporarily stopped. The registration roller pair 21 is rotationally driven to thereby feed the recording material P into the secondary transfer portion N2 in synchronization with the timing of the toner image formed on the intermediate transfer belt 31.

A conveyance guide (pre-transfer guide) 22 for guiding the recording material P to the secondary transfer portion N2 is provided at the downstream of the registration roller pair 21 and at the upstream of the secondary transfer portion N2 in the conveyance direction of the recording material P. The conveyance guide 22 includes a first guide member 22*a* and a second guide member 22*b*. The first guide member 22*a* can be brought into contact with the front surface (surface onto which the toner image is transferred after passing through the conveyance guide 22) of the recording material P. The second guide member 22*b* can be brought into contact with the back surface (surface opposite to the front surface) of the recording material P. The first guide member 22*a* and the second guide member 22*b* are opposed to each other and the recording material P passes through a gap formed between the first guide member 22*a* and the second guide member 22*b*. The first guide member 22*a* regulates the movement of the recording material P in a direction approaching the intermediate transfer belt 31. The second guide member 22*b* regulates the movement of the recording material P in a direction away from the intermediate transfer belt 31.

The recording material P onto which the toner image has been transferred is conveyed to a fixing device 50 serving as a fixing unit by a conveyance belt (pre-fixing conveyance device) 23 or the like. The fixing device 50 heats and pressurizes the recording material P carrying the unfixed toner image by nipping and conveying the recording material P with a fixing rotary member pair, thereby fixing (fusing, sticking) the toner image onto the surface of the recording material P. The recording material P having the toner image fixed thereon passes through the discharge conveyance path 68 and is discharged (output) onto a discharge tray 69 provided on the outside of an apparatus body 110 of the image forming apparatus 100.

In contrast, an adhering substance, such as residual toner (primary transfer residual toner) remaining on the surface of the photosensitive drum 11 after the primary transfer process, is removed from the surface of the photosensitive drum 11 and collected by the cleaning device 16 serving as a cleaning unit. An adhering substance, such as residual toner (secondary transfer residual toner) remaining on the intermediate transfer belt 31 after the secondary transfer process, is removed from the surface of the intermediate transfer belt 31 and is collected by a belt cleaning device 37 serving as an intermediate transfer body cleaning unit.

In the present exemplary embodiment, an intermediate transfer belt unit 30 serving as a belt conveyance device includes the intermediate transfer belt 31, the tension rollers 32 to 35, the primary transfer rollers 15, the belt cleaning device 37, the pressing member 70, and a frame that supports these members. The intermediate transfer belt unit 30 is detachably (in a drawable manner) attached to the apparatus body 110 of the image forming apparatus 100 for maintenance or replacement.

In the present exemplary embodiment, a structure formed of a resin-based material and having a single-layer or multi-layer structure, a structure having a multi-layer structure including a resin layer formed of a resin material and an elastic layer formed of an elastic material, or the like can be used as the intermediate transfer belt 31. In the present exemplary embodiment, the inner secondary transfer roller 32 has a structure in which an elastic layer formed of electronically conductive rubber is formed on the outer periphery of a cored bar made of metal. In the present exemplary embodiment, the pre-secondary transfer roller 35 is formed of a metallic roller. In the present exemplary embodiment, the outer secondary transfer roller 41 has a structure in which an elastic layer of ion conductive foamed rubber is formed on the outer periphery of a cored bar (core) made of metal. In the present exemplary embodiment, a bearing member (not illustrated) that axially supports both ends of the outer secondary transfer roller 41 in the rotational axis direction is slidably movable in the direction toward the inner secondary transfer roller 32 and in the opposite direction thereof. This bearing member is pressed against the inner secondary transfer roller 32 by a pressing spring 42 formed of a compression coil spring that is an urging member (elastic member) serving as an urging unit. Thus, the outer secondary transfer roller 41 is brought into contact with the inner secondary transfer roller 32 at a predetermined pressure with the intermediate transfer belt 31 interposed therebetween, thereby forming the secondary transfer portion N2. The rotational axis direction of the tension rollers, which include the inner secondary transfer roller 32, stretched around the intermediate transfer belt 31 and the rotational axis direction of the outer secondary transfer roller 41 are substantially parallel to each other.

2. Secondary Transfer Portion

Figure 2:
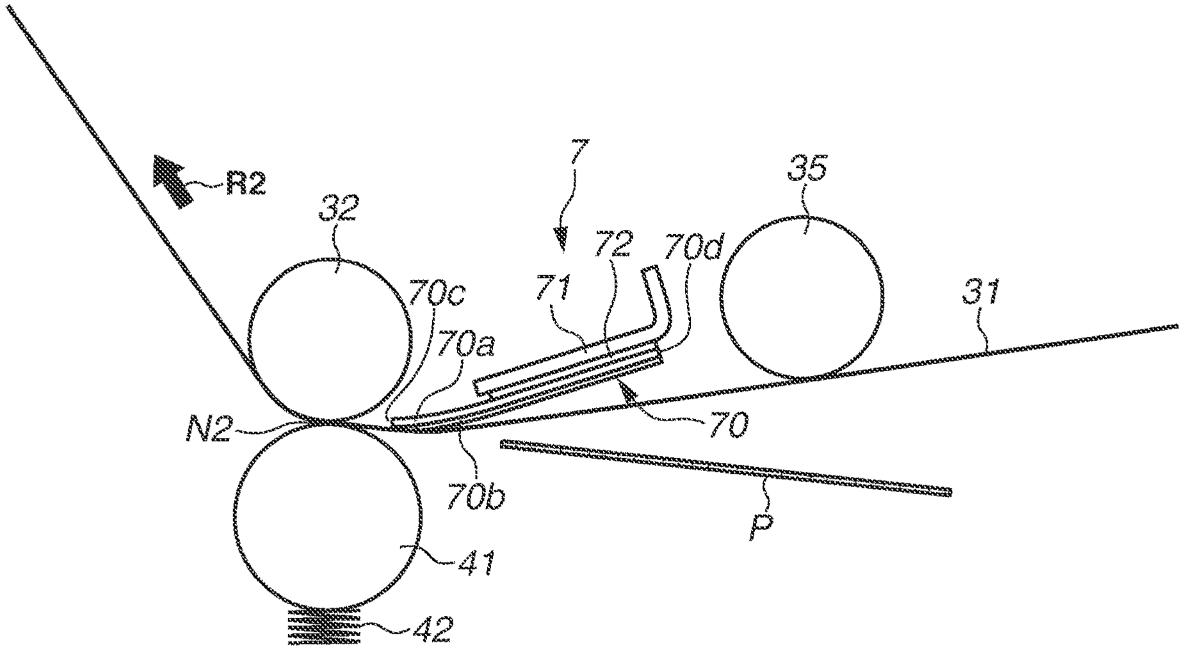
FIG. 2 is a schematic sectional view illustrating a portion in the vicinity of a secondary transfer portion.
Figure 3:
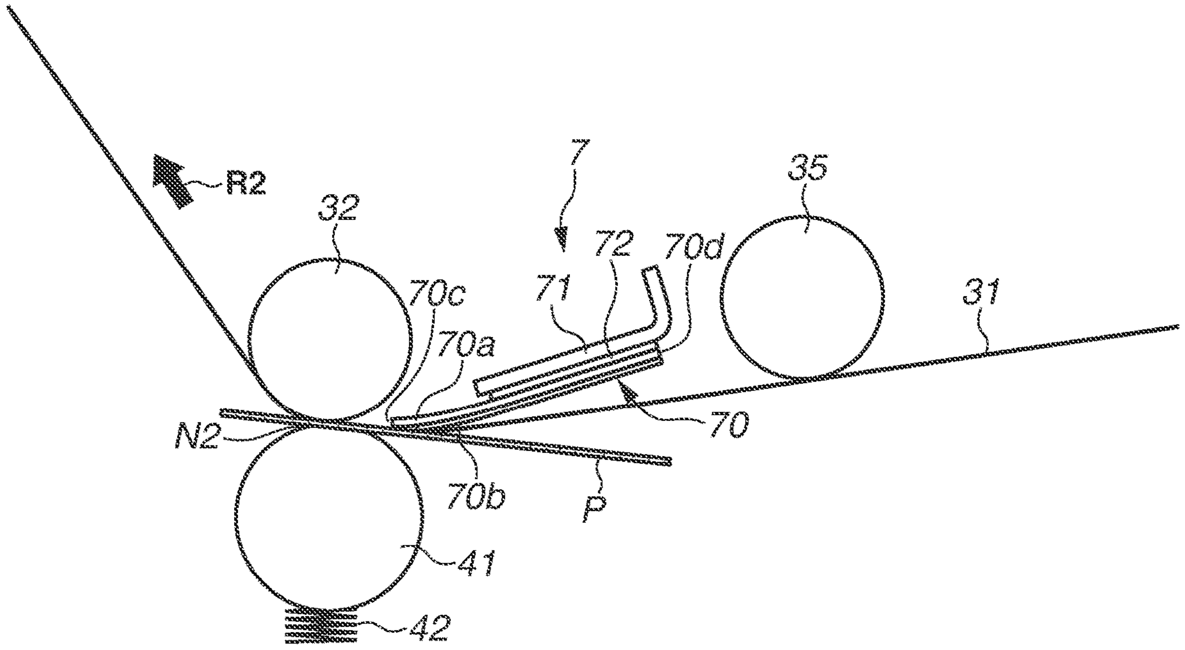
FIG. 3 is a schematic sectional view illustrating a portion in the vicinity of the secondary transfer portion.
Figure 4:
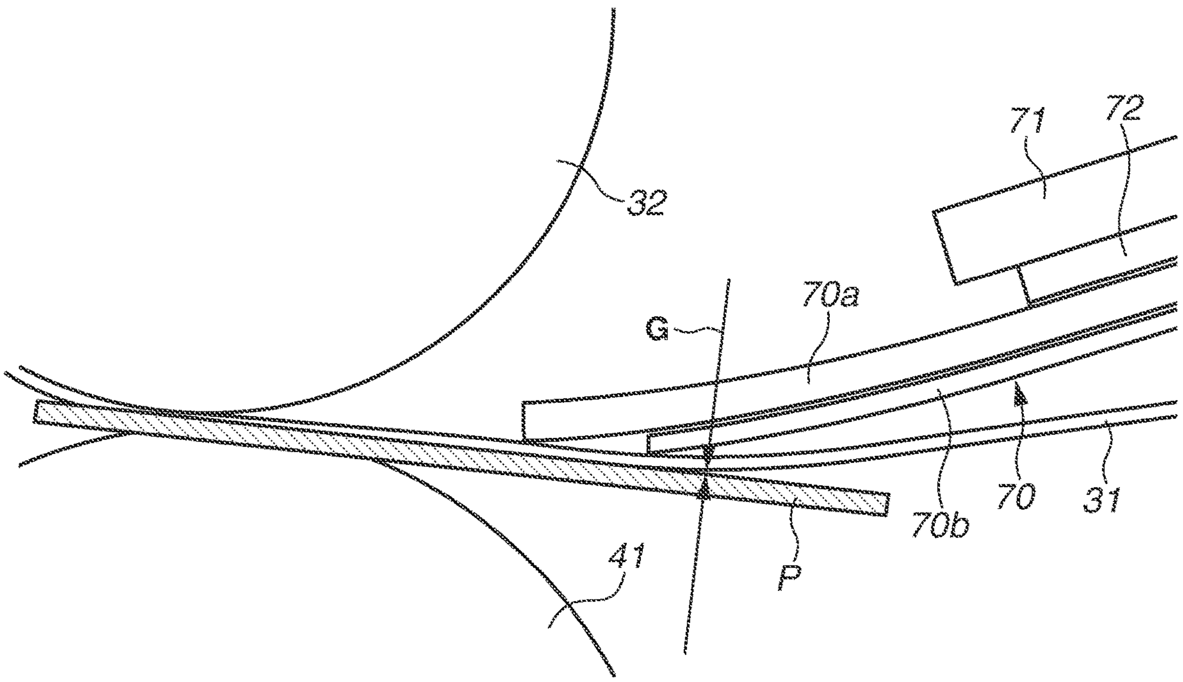
FIG. 4 is a schematic sectional view illustrating a portion in the vicinity of the secondary transfer portion.

FIGS. 2 to 4 are schematic sectional views each illustrating the shape (orientation) of the intermediate transfer belt 31 at the upstream of the secondary transfer portion N2 in the image forming apparatus 100 according to the present exemplary embodiment. The schematic sectional views each illustrate a section substantially orthogonal to the rotational axis direction of the inner secondary transfer roller 32. FIG. 2 illustrates a state before the recording material P moves to the secondary transfer portion N2. FIG. 3 illustrates a state after the recording material P has moved to the secondary transfer portion N2. FIG. 4 is an enlarged view illustrating a portion in the vicinity of the secondary transfer portion N2 illustrated in FIG. 3.

As illustrated in FIGS. 2 to 4, in the present exemplary embodiment, the outer secondary transfer roller 41 is elastically urged against the inner secondary transfer roller 32 by the pressing spring 42 with respect to the shape of the intermediate transfer belt 31 formed by being stretched around the inner secondary transfer roller 32 and the pre-secondary transfer roller 35. Thus, the intermediate transfer belt 31 is nipped between the inner secondary transfer roller 32 and the outer secondary transfer roller 41 to thereby form the secondary transfer portion N2.

In the present exemplary embodiment, the pressing member (backup member, backup sheet) 70 is supported by a support member 71 and is located near the inner secondary transfer roller 32 at the upstream of the secondary transfer portion N2. In the present exemplary embodiment, the inner circumferential surface of the intermediate transfer belt 31 and the leading edge portion of the pressing member 70 are in contact with each other. The pressing member 70 can be brought into contact with the inner circumferential surface of the intermediate transfer belt 31 to press the intermediate transfer belt 31 against the outer circumferential surface from the inner circumferential surface of the intermediate transfer belt 31. This enables the pressing member 70 enables a stretched surface of the intermediate transfer belt 31 formed between the inner secondary transfer roller 32 and the pre-secondary transfer roller 35 to project toward the outer circumferential surface from the inner circumferential surface of the intermediate transfer belt 31. In the present exemplary embodiment, the pressing member 70 is formed of a flexible plate-like member made of resin, and the pressing member 70 elastically urges the intermediate transfer belt 31 using deflection elasticity of the pressing member 70. In the present exemplary embodiment, as described in detail below, the pressing member 70 includes a first sheet 70*a* formed of a polyethylene terephthalate (PET) material with a thickness of 0.5 mm, and a second sheet 70*b* formed of a PET material with a thickness of 0.25 mm. Accordingly, the shape (deflection amount, deformation amount) or position of the pressing member 70 is determined such that an urging force with which the intermediate transfer belt 31 is urged by the pressing member 70 matches a reaction caused by the tension of the intermediate transfer belt 31. In this case, the shape (or position) of the pressing member 70 thus determined is also referred to as a "static shape (or static position)". The static shape (static position) of the pressing member 70 forms the shape (orientation) of the intermediate transfer belt 31 at the upstream of the secondary transfer portion N2. In the present exemplary embodiment, the pressing member 70 is formed such that the free length can be adjusted by the action of an adjustment member 72 as described in detail below. This makes it possible to maintain the amount of deformation of the intermediate transfer belt 31 due to pressing of the pressing member 70 to be a desired value even when the thickness or Young's modulus of the pressing member 70 varies.

Figure 5A:
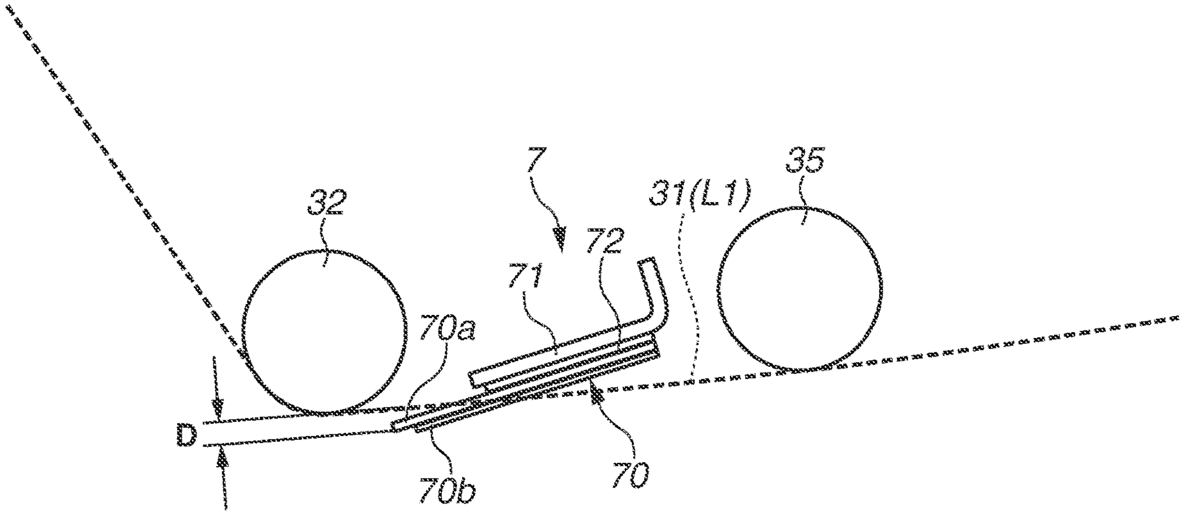
FIGS. 5A and 5B are schematic sectional views each illustrating an inroad amount of a pressing member.
Figure 5B:
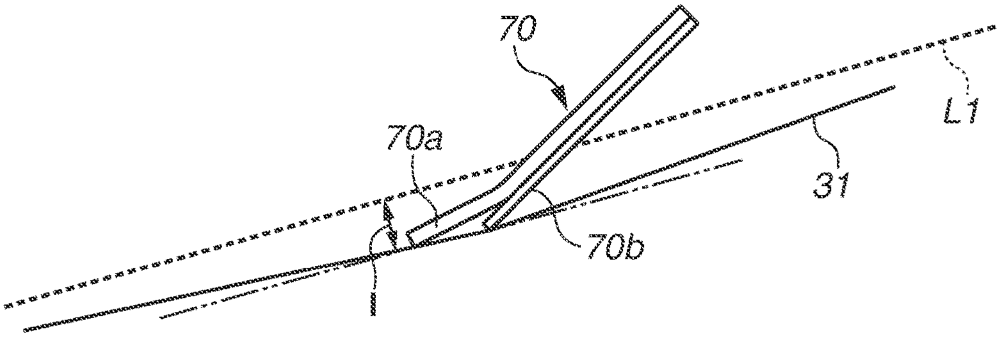

FIGS. 5A and 5B are schematic sectional views each illustrating an inroad amount or pressing amount of the pressing member 70 against the intermediate transfer belt 31. The schematic sectional views illustrate sections substantially orthogonal to the rotational axis direction of the inner secondary transfer roller 32. FIG. 5A illustrates a state where the intermediate transfer belt 31 is dismounted. The stretched surface of the intermediate transfer belt 31 in a state where the pressing member 70 is not present is indicated by a broken line (common tangent L1 to be described below). FIG. 5B illustrates a state where the intermediate transfer belt 31 is pressed by the pressing member 70. The stretched surface of the intermediate transfer belt 31 in a state where the pressing member 70 is not present is indicated by the broken line (common tangent L1 to be described below).

The pressing amount of the pressing member 70 against the intermediate transfer belt 31 is substantially equal to the amount of projection of the intermediate transfer belt 31 that is allowed to project toward the outside by the pressing member 70 with respect to the stretched surface of the intermediate transfer belt 31 formed by being stretched around the inner secondary transfer roller 32 and the pre-secondary transfer roller 35. The pre-secondary transfer roller 35 is an example of an upstream roller located adjacent to the inner secondary transfer roller 32 at the upstream of the inner secondary transfer roller 32 of the plurality of tension rollers in the rotational direction of the intermediate transfer belt 31. Specifically, as illustrated in FIGS. 5A and 5B, a tangential line common to the inner secondary transfer roller 32 and the pre-secondary transfer roller 35 on the side in contact with the intermediate transfer belt 31 is referred to as the common tangent L1. In this case, as illustrated in FIG. 5B, a pressing amount I of the pressing member 70 can be defined as a normal distance from the common tangent L1 to the leading edge of the pressing member 70 (distance between the common tangent L1 and a line that passes through the leading edge of the pressing member 28 and is parallel to the common tangent L1). Depending on relative positions of the inner secondary transfer roller 32 and the outer secondary transfer roller 41 in the rotational direction of the intermediate transfer belt 31, the intermediate transfer belt 31 may be stretched around the outer secondary transfer roller 41 and the pre-secondary transfer roller 35 and the stretched surface of the intermediate transfer belt 31 may be formed at the upstream of the secondary transfer portion N2. In this case, in the same manner as described above, the pressing amount can be defined with respect to the tangential line common to the outer secondary transfer roller 41 and the pre-secondary transfer roller 35 on the side in contact with the intermediate transfer belt 31. In the present exemplary embodiment, the pressing amount of the pressing member 70 against the intermediate transfer belt 31 can be controlled based on the inroad amount of the pressing member 70 (position of the distal end of the pressing member 70) with respect to the intermediate transfer belt 31. As illustrated in FIG. 5A, an inroad amount D of the pressing member 70 with respect to the intermediate transfer belt 31 can be defined as a normal distance between the common tangent L1 and the leading edge of the pressing member 70 in a state where the intermediate transfer belt 31 is not stretched. In other words, the normal distance is a distance between the common tangent L1 and the line that passes through the leading edge of the pressing member 70 in a state where the intermediate transfer belt 31 is not stretched and is parallel to the common tangent L1. For example, the inroad amount D is set to about 1.5 to 3.8 mm, and the pressing amount I is set to about 1.0 to 3.0 mm.

In the present exemplary embodiment, a bias with the same polarity as the charging polarity of toner forming the toner image on the intermediate transfer belt 31 is applied to the inner secondary transfer roller 32, and the outer secondary transfer roller 41 is connected to the ground. As a result, a transfer electric field is formed at the secondary transfer portion N2. In the secondary transfer portion N2 at which the transfer electric field is formed, the recording material P is guided and fed by the conveyance guide 22 (FIG. 1). As illustrated in FIG. 2, the leading edge of the recording material P is brought into contact with the intermediate transfer belt 31 at the upstream of the secondary transfer portion N2. The recording material P is further conveyed toward the secondary transfer portion N2 in a state where the recording material P is in contact with the toner image formed on the surface of the intermediate transfer belt 31. As illustrated in FIG. 3, when the recording material P is conveyed to the secondary transfer portion N2, the toner image is transferred onto the recording material P from the intermediate transfer belt 31 by an action of pressurization between the inner secondary transfer roller 32 and the outer secondary transfer roller 41 and an electric action by the transfer electric field.

To accurately perform the secondary transfer process, the length of an area (also referred to as a "contact length") is important. The area is an area where the intermediate transfer belt 31 and the recording material P are in contact with each other in the rotational direction of the intermediate transfer belt 31 at the upstream of the secondary transfer portion N2 when the recording material P is conveyed to the secondary transfer portion N2.

In the case of transferring the toner image onto the recording material P, if the contact length is long, an image defect or the like can be caused by sliding friction between the recording material P and the toner image formed on the surface of the intermediate transfer belt 31. In contrast, if the contact length is short, an airspace (gap) G (FIG. 4) formed between the intermediate transfer belt 31 and the recording material P increases, which may cause an image defect or the like due to an electric discharge phenomenon that occurs in the airspace G. In the present exemplary embodiment, the adjustment member 72 to be described below adjusts the free length of the pressing member 70 to control the shape of the intermediate transfer belt 31 at the upstream of the secondary transfer portion N2. Thus, the length of the area where the intermediate transfer belt 31 and the recording material P are in contact with each other is optimized to thereby stably secondarily transfer the toner image onto the recording material P.

The image forming apparatus 100 according to the present exemplary embodiment achieves high productivity, and the intermediate transfer belt 31 is conveyed at a speed of 600 [mm/s]. In the image forming apparatus 100 according to the present exemplary embodiment, toner is charged with the negative polarity. In the image forming apparatus 100 according to the present exemplary embodiment, a high voltage bias of −10 [kV] is applied to the inner secondary transfer roller 32 so as to ensure an appropriate transfer performance even at the conveyance speed of the intermediate transfer belt 31. The conveyance speed of the intermediate transfer belt 31, the polarity of toner, and the value of the secondary transfer voltage are not limited to these values.

3. Pressing Member

The pressing member 70 according to the present exemplary embodiment will now be described.

The pressing member 70 is brought into contact with the inner circumferential surface of the intermediate transfer belt 31 stretched around the inner secondary transfer roller 32. The pre-secondary transfer roller 35 of the plurality of tension rollers around which the intermediate transfer belt 31 is then stretched, thereby pressing the intermediate transfer belt 31 against the outer circumferential surface from the inner circumferential surface of the intermediate transfer belt 31. Specifically, the pressing member 70 is located such that the pressing member 70 can be brought into contact with the inner circumferential surface of the intermediate transfer belt 31 at the upstream of the inner secondary transfer roller 32 and at the downstream of the pre-secondary transfer roller 35 in the rotational direction of the intermediate transfer belt 31. Particularly, in the present exemplary embodiment, the pressing member 70 is located such that the pressing member 70 can be brought into contact with the inner circumferential surface of the intermediate transfer belt 31 at the upstream of the inner secondary transfer roller 32 and at the downstream of the leading edge at the downstream side of the conveyance guide 22 (first guide member 22*a*) in the conveyance direction of the recording material P.

In the present exemplary embodiment, the entire pressing member 70 has a predetermined length in the longitudinal direction substantially parallel to a width direction of the intermediate transfer belt 31, and a predetermined length in a widthwise direction substantially orthogonal to the longitudinal direction. The pressing member 70 is formed of a plate-like (sheet-like) member having a predetermined thickness and a substantially rectangular shape in planar view. The width direction of the intermediate transfer belt 31 is substantially orthogonal to the movement direction of the surface of the intermediate transfer belt 31, and is substantially parallel to the rotational axis direction of the inner secondary transfer roller 32. The length of the pressing member 70 in the longitudinal direction is equivalent to the length of the intermediate transfer belt 31 in the width direction. A free end portion (distal end) 70*c* that is one end of the pressing member 70 in the widthwise direction (end portion at the downstream side in the rotational direction of the intermediate transfer belt 31) can be brought into contact with the inner circumferential surface of the intermediate transfer belt 31 over substantially the entire width of the intermediate transfer belt 31, thereby making it possible to press the intermediate transfer belt 31. In the present exemplary embodiment, a part of the pressing member 70 at a fixing end portion (proximal end) 70*d*, which is another end in the widthwise direction (end portion at the upstream side in the rotational direction of the intermediate transfer belt 31) is fixed to the support member 71 via the adjustment member 72. The pressing member 70, or more specifically, an end portion (simply referred to as a "distal end") at the free end portion (distal end) 70*c* in the width wise direction of the pressing member 70 may be desirably located as close to the inner secondary transfer roller 32 as possible. The pressing member 70 is located such that the pressing member 70 is not in contact with the inner secondary transfer roller 32. The pressing member 70 is located in contact with the inner circumferential surface of the intermediate transfer belt 31 at a distance of, for example, about 2 mm or more, typically, about 10 mm or more, from the position where the inner secondary transfer roller 32 and the intermediate transfer belt 31 are in contact with each other to the upstream side in the rotational direction of the intermediate transfer belt 31. The pressing member 70 is located in contact with the inner circumferential surface of the intermediate transfer belt 31 at a distance of, for example, about 40 mm or less, typically, about 25 mm or less, from the position where the inner secondary transfer roller 32 and the intermediate transfer belt 31 are in contact with each other to the upstream side in the rotational direction of the intermediate transfer belt 31.

In the present exemplary embodiment, the pressing member 70 includes the first sheet 70*a* and the second sheet 70*b*. In the present exemplary embodiment, the first sheet 70*a* is attached to the adjustment member 72 with a double-sided tape that is an attaching member serving as a fixing unit. Further, in the present exemplary embodiment, the second sheet 70*b* is attached to the surface of the first sheet 70*a* on the side of the intermediate transfer belt 31 with a double-sided tape that is an attaching member serving as a fixing unit. In the present exemplary embodiment, the second sheet 70*b* is attached to the first sheet 70*a* such that the leading edge of the second sheet 70*b* is shifted toward the upstream side in the rotational direction of the intermediate transfer belt 31 with respect to the leading edge of the first sheet 70*a*. The adjustment member 72 is fixed to the support member 71 with screws that are fastening members each serving as a fixing unit. The first sheet 70*a* and the second sheet 70*b* can be fixed by another fixing process such as bonding or fastening. Similarly, the first sheet 70*a* and the adjustment member 72 can be fixed by another fixing process such as bonding or fastening. Similarly, the adjustment member 72 and the support member 71 can be fixed by another fixing process such as bonding or a double-sided tape. In the present exemplary embodiment, as illustrated in FIG. 4, the leading edge of the first sheet 70*a* and the leading edge of the second sheet 70*b* allow the pressing member 70 to be brought into contact with the inner circumferential surface of the intermediate transfer belt 31.

In the present exemplary embodiment, the first sheet 70*a* is formed of a resin material (e.g., polyester resin) and is a sheet-like member with a thickness of about 0.4 to 0.6 mm. In the present exemplary embodiment, the second sheet 70*b* is formed of a resin material (e.g., polyester resin) and is a sheet-like member with a thickness of about 0.2 to 0.3 mm. Particularly, in the present exemplary embodiment, the pressing member 70 includes the first sheet 70*a* formed of a PET material with a thickness of 0.5 mm, and the second sheet 70*b* formed of a PET material with a thickness of 0.25 mm.

The pressing member 70 is not limited to the structure described in the present exemplary embodiment, and any structure may be used as long as the intermediate transfer belt 31 can be elastically urged. In the present exemplary embodiment, the pressing member 70 is formed by bonding two sheet-like members, i.e., the first sheet 70*a* and the second sheet 70*b*, so as to obtain the stable contact state on the intermediate transfer belt 31. Alternatively, the pressing member 70 can be formed of, for example, a single sheet-like member corresponding to the first sheet 70*a* according to the present exemplary embodiment. The pressing member 70 can have a thickness of, for example, about 1.0 mm. The material forming the pressing member 70 is not limited to PET. Polyether ether ketone (PEEK), polyphenylene sulfide (PPS), or the like can also be used.

In the present exemplary embodiment, a pressing member unit 7 includes the pressing member 70, the support member 71, and the adjustment member 72.

4. Adjustment Member

The structure of the adjustment member 72 according to the present exemplary embodiment will now be further described.

Figure 6:
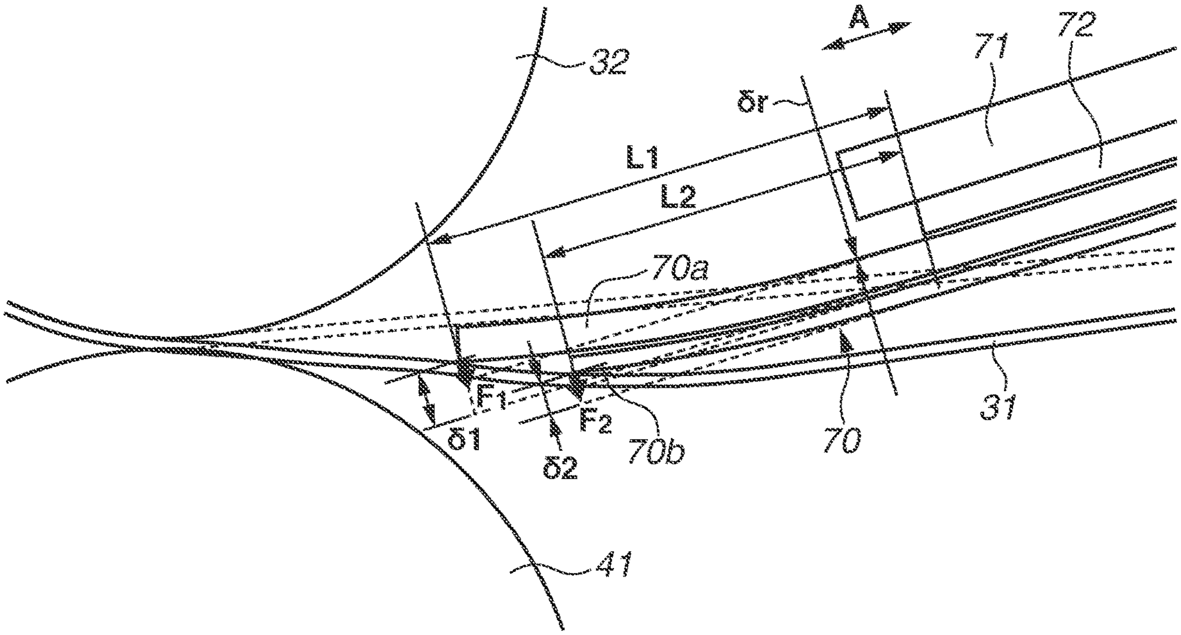
FIG. 6 is a schematic sectional view illustrating details of a distal end portion of the pressing member.
Figure 7:
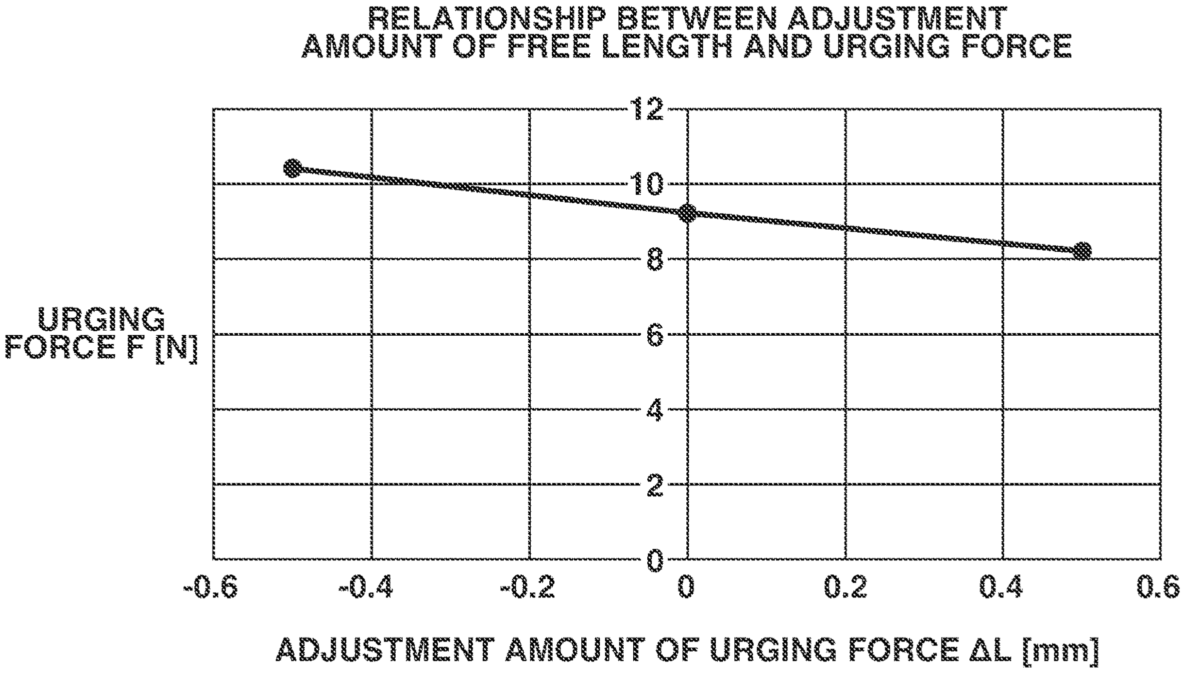
FIG. 7 is a graph illustrating a relationship between an adjustment amount of a free length of the pressing member and an urging force.

FIG. 6 is a schematic sectional view illustrating the pressing member 70, the adjustment member 72, and the support member 71 in the vicinity of the secondary transfer portion N2. The schematic sectional view illustrates a section substantially orthogonal to the rotational axis direction of the inner secondary transfer roller 32. FIG. 7 is a schematic graph illustrating a relationship between an urging force F and an adjustment amount ΔL of the free length of the pressing member 70.

In the present exemplary embodiment, as illustrated in FIG. 6, the adjustment member 72 is located between the pressing member 70 and the support member 71. The adjustment member 72 is configured to adjust a mounting position in a direction indicated by an arrow A in FIG. 6 with respect to the pressing member 70, and to adjust the free length of the pressing member 70. The direction indicated by the arrow A corresponds to the direction along the movement direction of the intermediate transfer belt 31. In the present exemplary embodiment, the direction indicated by the arrow A is substantially parallel to the surface on the side of the adjustment member 72 of the support member 71 having a substantially planar shape. The free length of the pressing member 70 corresponds to the length of the portion of the pressing member 70 protruding from the adjustment member 72 in the direction (direction indicated by the arrow A) along the movement direction of the intermediate transfer belt 31. The pressing member 70 is in a static state at the position where the urging force F with which the intermediate transfer belt 31 is urged matches the reaction caused by the tension of the intermediate transfer belt 31. The static position of the pressing member 70 forms the shape of the intermediate transfer belt 31 at the upstream of the secondary transfer portion N2.

The urging force F of the pressing member 70 is calculated by the following formula, using a thickness t, a width (length in the longitudinal direction) h, a free length L, Young's modulus E, and a deflection amount δ of the pressing member 70.

$$F = \frac{Eht^3\delta}{4L^3}$$

Accordingly, if the Young's modulus E or the thickness t of the pressing member 70 varies, the urging force F fluctuates, which may make it difficult to form an optimum shape of the intermediate transfer belt 31 at the upstream of the secondary transfer portion N2. In the present exemplary embodiment, the urging force F can thus be corrected into an optimum value by adjusting the free length L.

To obtain the optimum urging force F, the deflection amounts of the first sheet 70*a* and the second sheet 70*b* of the pressing member 70 are represented by 61 and 62, respectively. The free lengths L of the first sheet 70*a* and the second sheet 70*b* of the pressing member 70 are represented by $L_1$ and $L_2$, respectively. A gap (formed due to a double-sided tape) is formed between the first sheet 70*a* and the second sheet 70*b* of the pressing member 70. Thus, the urging force F caused due to the deflection in each of the first sheet 70*a* and the second sheet 70*b* can be considered independently. When the urging forces caused due to the deflection in the first sheet 70*a* and the deflection in the second sheet 70*b* of the pressing member 70 are represented by $F_1$ and $F_2$, respectively, the urging force F applied to the intermediate transfer belt 31 is expressed as $F=F_1+F_2$. $F_1$ and $F_2$ can be expressed by the following formulas, using thicknesses $t_1$ and $t_2$, widths $h_1$ and $h_2$, and Young's moduli $E_1$ and $E_2$.

$$F_1 = \frac{E_1 h_1 t_1^3 \delta_1}{4L_1^3}$$

$$F_2 = \frac{E_2 h_2 t_2^3 \delta_2}{4L_2^3}$$

When the adjustment amount of the free length L from a nominal value is represented by ΔL and a nominal design value is input to each parameter, the relationship between the urging force F and the adjustment amount ΔL of the free length L of the pressing member 70 can be expressed as illustrated in FIG. 7. The relational formula can be represented by the following approximation.

$$F=-2.2\Delta L+9.3$$

The urging force F of the pressing member 70 can be corrected into an optimum value by adjusting the free length L of the pressing member 70, accordingly.

In the present exemplary embodiment, as described above, the adjustment member 72 is located between the pressing member 70 and the support member 71. The adjustment member 72 is configured such that the mounting position of the adjustment member 72 can be adjusted in the direction indicated by the arrow A in FIG. 6 with respect to the pressing member 70 and the support member 71. In the present exemplary embodiment, during assembly of the adjustment member 72, the adjustment member 72 is located and temporarily fixed at a certain position in an adjustment direction (direction indicated by the arrow A). In such a state, the urging force F of the pressing member 70 when the deflection amount of the pressing member 70 is set to a predetermined deflection amount is actually measured. More specifically, the urging force F of the pressing member 70 when the deflection amounts of the first sheet 70*a* and the second sheet 70*b* of the pressing member 70 are represented by 61 and 62, respectively, is actually measured.

The free length L is thus adjusted based on the difference between the optimum value and the actual measurement value. In other words, the adjustment amount ΔL of the free length L for correcting the difference is obtained by the above-described formula, and the adjustment member 72 and the pressing member 70 are adjusted during assembly and fixed so that the free length L satisfies L+ΔL. Specifically, the adjustment member 72 is moved in the adjustment direction (direction indicated by the arrow A) relative to the pressing member 70 and the support member 71 so that the free length L satisfies L+ΔL, and then the pressing member 70 is fixed to the adjustment member 72.

According to the present exemplary embodiment, the amount of deformation of the intermediate transfer belt 31 due to pressing of the pressing member 70 can be optimized by adjusting the free length L of the pressing member 70 even when the thickness or Young's modulus of the flexible resin material varies from the nominal value. Thus, the shape of the intermediate transfer belt 31 at the upstream of the secondary transfer portion N2 is controlled to optimize the contact length between the intermediate transfer belt 31 and the recording material P, thereby preventing the occurrence of an image defect.

In this case, the free length L can be adjusted by moving the pressing member 70 relatively to the support member 71 without providing the adjustment member 72. In this case, however, the position of the distal end of the pressing member 70 varies with respect to the intermediate transfer belt 31. As a result, the pressing force of the pressing member 70 that presses the inner circumferential surface of the intermediate transfer belt 31 decreases, and the deformation amount of the intermediate transfer belt 31 due to pressing of the pressing member 70 at the upstream of the secondary transfer portion N2 decreases, for example. In contrast in the present exemplary embodiment, the position of the distal end of the pressing member 70 is determined with respect to the support member 71, and only the adjustment member 72 is moved in the adjustment direction (direction indicated by the arrow A), thereby making it possible to adjust the free length L of the pressing member 70.

A hard material, such as metal, can also be used as the material for the pressing member 70. In such a case, the effect of variations in the material of the pressing member 70 can be suppressed. In this case, however, the inner circumferential surface of the intermediate transfer belt 31 is worn away and an uneven surface is more likely to be formed. If unevenness occurs on the inner circumferential surface of the intermediate transfer belt 31, a current cannot be stably applied at the secondary transfer portion N2, which may cause an image defect. Since a high-voltage current is applied to the secondary transfer portion N2, the current is more likely to leak to the pressing member 70 if the pressing member 70 is formed of metal and an appropriate current does not flow to the secondary transfer portion N2, which may cause an image defect. If the pressing member 70 is spaced apart and located at a position where the transfer current does not leak, the surface of the intermediate transfer belt 31 formed between the pressing member 70 and the inner secondary transfer roller 32 and the outer secondary transfer roller 41 is more likely to be deformed, so that the effect of providing the pressing member 70 can be insufficient. Thus, it may be desirable to form the pressing member 70 using a flexible resin material. However, the material of the pressing member 70 is not limited to a resin material.

In the present exemplary embodiment, as illustrated in FIG. 6, the thickness of the adjustment member 72 is set to be greater than a deflection amount $\delta_r$ of the pressing member 70 at the distal end of the support member 71. This prevents the pressing member 70 from contacting the support member 71 when the pressing member 70 is deformed. Thus, the support member 71 can be prevented from regulating the free length L of the pressing member 70.

It may also be desirable to form the adjustment member 72 using a flat plate in consideration of the space. However, a high flatness of the adjustment member 72 cannot be easily obtained. In the present exemplary embodiment, the adjustment member 72 is formed of a sheet metal (plate-like metal member) with a thickness of 0.5 mm. The thickness of the adjustment member 72 may preferably have a thickness of about 0.2 to 0.75 mm. In contrast, in the present exemplary embodiment, the support member 71 is formed of a sheet metal (plate-like metal member) with a thickness of 1.2 mm. The support member 71 is typically formed of a plate-like member. However, the shape of the support member 71 is not limited to a plate-like shape. In the present exemplary embodiment, the thickness of the adjustment member 72 is set to be smaller than the thickness of the support member 71. Thus, during mounting of the adjustment member 72, the adjustment member 72 is formed to conform to the support member 71, thereby making it possible to obtain a high flatness of the adjustment member 72. The material of the adjustment member 72 is not limited to metal. For example, the adjustment member 72 may be formed of a resin material. Similarly, the material of the support member 71 is not limited to metal. For example, the support member 71 may be formed of a resin material.

Figure 8:
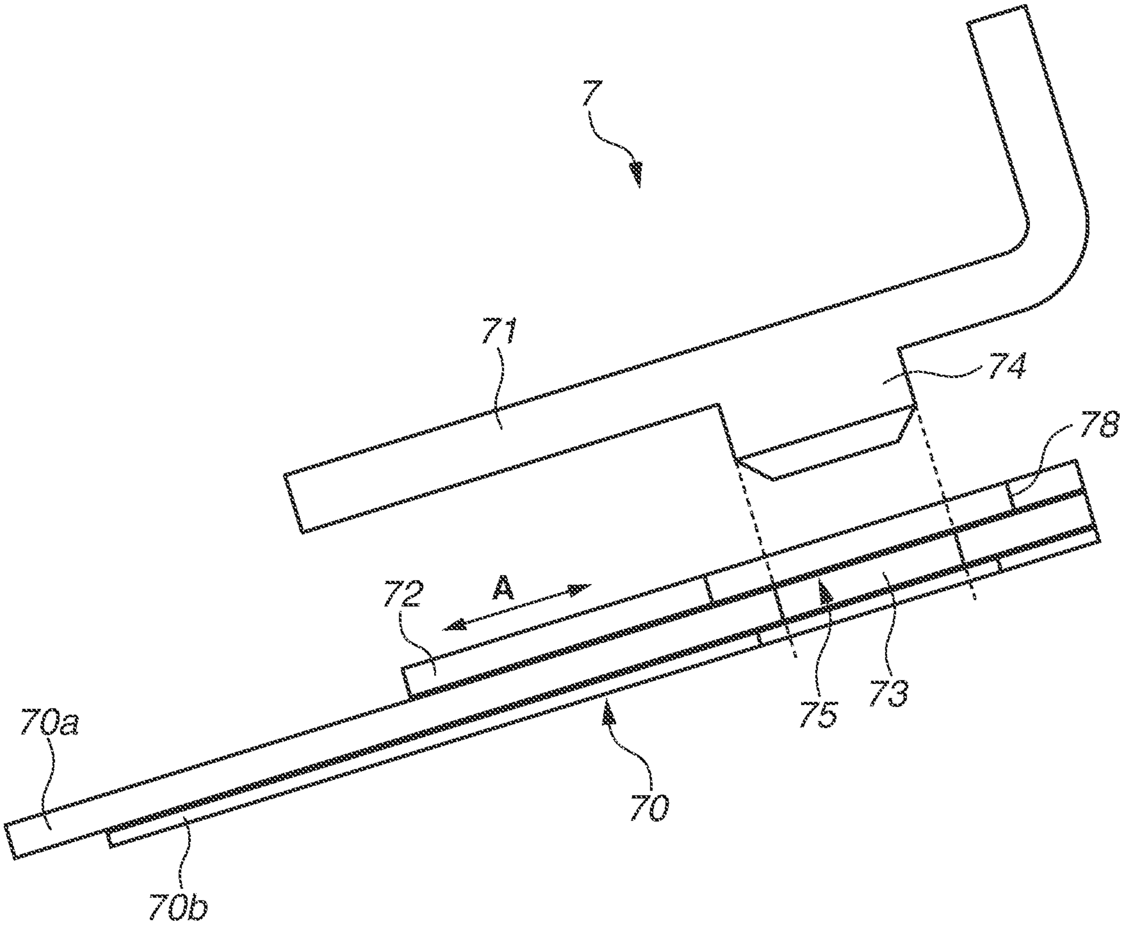
FIG. 8 is a schematic sectional view illustrating an example of a pressing member positioning structure.

FIG. 8 is a schematic sectional view illustrating an example of a positioning structure of the pressing member 70, The schematic sectional view illustrates a section substantially orthogonal to the rotational axis direction of the inner secondary transfer roller 32. The pressing member 70 and the adjustment member 72 are adjusted during assembly and fixed as described above. The pressing member 70 is provided with a positioning hole 73 for positioning the pressing member 70 with respect to the support member 71. The support member 71 is provided with a positioning pin (positioning protrusion) 74 that fits the positioning hole 73. A positioning portion 75 formed of the positioning hole 73 and the positioning pin 74 positions the pressing member 70 with respect to the support member 71 in the direction along the movement direction of the intermediate transfer belt 31. Thus, the pressing member 70 is positioned with respect to the support member 71, thereby securing the position of the distal end of the pressing member 70 as described above. Further, the adjustment member 72 is provided with an escape hole (insertion section) 78 that forms an escape portion and allows the positioning pin 74 of the positioning portion 75 to escape in the direction along the movement direction of the intermediate transfer belt 31, or the adjustment direction (direction indicated by the arrow A) of the adjustment member 72. The escape hole 78 is formed of, for example, a long hole elongated in the adjustment direction such that the adjustment member 72 does not interfere with the positioning pin 74 even when the adjustment member 72 is fixed at any position within an adjustment range in the adjustment direction of the adjustment member 72.

In the example illustrated in FIG. 8, the pressing member 70 and the adjustment member 72 that are adjusted during assembly and fixed are positioned with respect to the support member 71 by the positioning portion 75 when the pressing member 70 is mounted (replaced) on the support member 71. Further, the support member 71 is fixed to, for example, a mounting member (not illustrated) provided on the intermediate transfer belt unit 30 (or the apparatus body 110) with screws or the like. This makes it possible to secure the optimum urging force F of the pressing member 70 and the optimum position of the distal end thereof in a state where the free length L of the pressing member 70 and the position of the pressing member 70 with respect to the support member 71 are optimized. Thus, the deformation amount of the intermediate transfer belt 31 due to pressing of the pressing member 70 can be optimized. Consequently, the shape of the intermediate transfer belt 31 at the upstream of the secondary transfer portion N2 is controlled to optimize the contact length between the intermediate transfer belt 31 and the recording material P, thereby preventing the occurrence of an image defect.

As described above, in the present exemplary embodiment, the image forming apparatus 100 includes the rotatable endless belt (intermediate transfer belt) 31 for carrying a toner image, the plurality of tension rollers around which the intermediate transfer belt 31 is stretched and which includes the inner roller (inner secondary transfer roller) 32 and the upstream roller (pre-secondary transfer roller) 35 located adjacent to the inner secondary transfer roller 32 at the upstream of the inner secondary transfer roller 32 in the rotational direction of the intermediate transfer belt 31, the outer member (outer secondary transfer roller) 41 that is opposed to the inner secondary transfer roller 32 and forms the transfer portion N2 that transfers the toner image to the recording material P from the intermediate transfer belt 31 in contact with the outer circumferential surface of the intermediate transfer belt 31, the pressing member 70 that is configured to be brought into contact with the inner circumferential surface of the intermediate transfer belt 31 at the upstream of the inner secondary transfer roller 32 and at the downstream of the upstream roller 35 in the rotational direction of the intermediate transfer belt 31 and is configured to press the intermediate transfer belt 31 against the outer circumferential surface from the inner circumferential surface of the intermediate transfer belt 31, the support member 71 that supports the pressing member 70 on the opposite side of the intermediate transfer belt 31 with respect to the pressing member 70, and the adjustment member 72 located between the pressing member 70 and the support member 71. The adjustment member 72 is configured to adjust the length of the portion of the pressing member 70 that protrudes from the adjustment member 72 in the direction along the movement direction of the intermediate transfer belt 31 by changing the position with respect to the pressing member 70 in the direction along the movement direction of the intermediate transfer belt 31. In the present exemplary embodiment, the image forming apparatus 100 also includes the positioning portion 75 that positions the pressing member 70 with respect to the support member 71 in the direction along the movement direction of the intermediate transfer belt 31. The adjustment member 72 is provided with an escape portion (escape hole 78) that allows the positioning portion 75 to escape in the direction along the movement direction of the intermediate transfer belt 31. In the present exemplary embodiment, the positioning portion 75 includes the positioning hole 73 provided in the pressing member 70 and the positioning protrusion 74 that is provided in the support member 71 and fits the positioning hole 73. In the present exemplary embodiment, the thickness of the adjustment member 72 is set such that the pressing member 70 is not in contact with the support member 71 when the pressing member 70 is brought into contact with the intermediate transfer belt 31 and is deformed. In the present exemplary embodiment, the thickness of the adjustment member 72 is smaller than the thickness of the support member 71. In the present exemplary embodiment, the pressing member 70 is formed using a flexible plate-like resin member. In the present exemplary embodiment, the longitudinal direction of the pressing member 70 is substantially parallel to the width direction of the intermediate transfer belt 31, and at last a part of the end portion at the upstream side in the movement direction of the intermediate transfer belt 31 in the widthwise direction is supported by the support member 71 via the adjustment member 72, and the end portion at the downstream side in the movement direction of the intermediate transfer belt 31 can be brought into contact with the inner circumferential surface of the intermediate transfer belt 31. In the present exemplary embodiment, the pressing member 70 is formed by fixing a plurality of plate-like members. In the present exemplary embodiment, the adjustment member 72 is formed using a plate-like metal member.

As described above, according to the present exemplary embodiment, the deformation amount of the intermediate transfer belt 31 due to pressing of the pressing member 70 can be optimized even when the thickness or Young's modulus of the material of the pressing member 70 varies from the nominal value.

Another exemplary embodiment of the present disclosure will now be described. The basic structure and operation of the image forming apparatus according to the present exemplary embodiment are the same as those of the first exemplary embodiment. Thus, elements including functions or configurations identical or corresponding to those of the first exemplary embodiment in the image forming apparatus according to the present exemplary embodiment are denoted by the same reference numerals as those of the first exemplary embodiment, and detailed descriptions thereof are omitted.

In the present exemplary embodiment, another example of a positioning structure of a pressing member 70 and a more specific example of an assembling method of a pressing member unit 7, and the like will be described.

Figure 9:
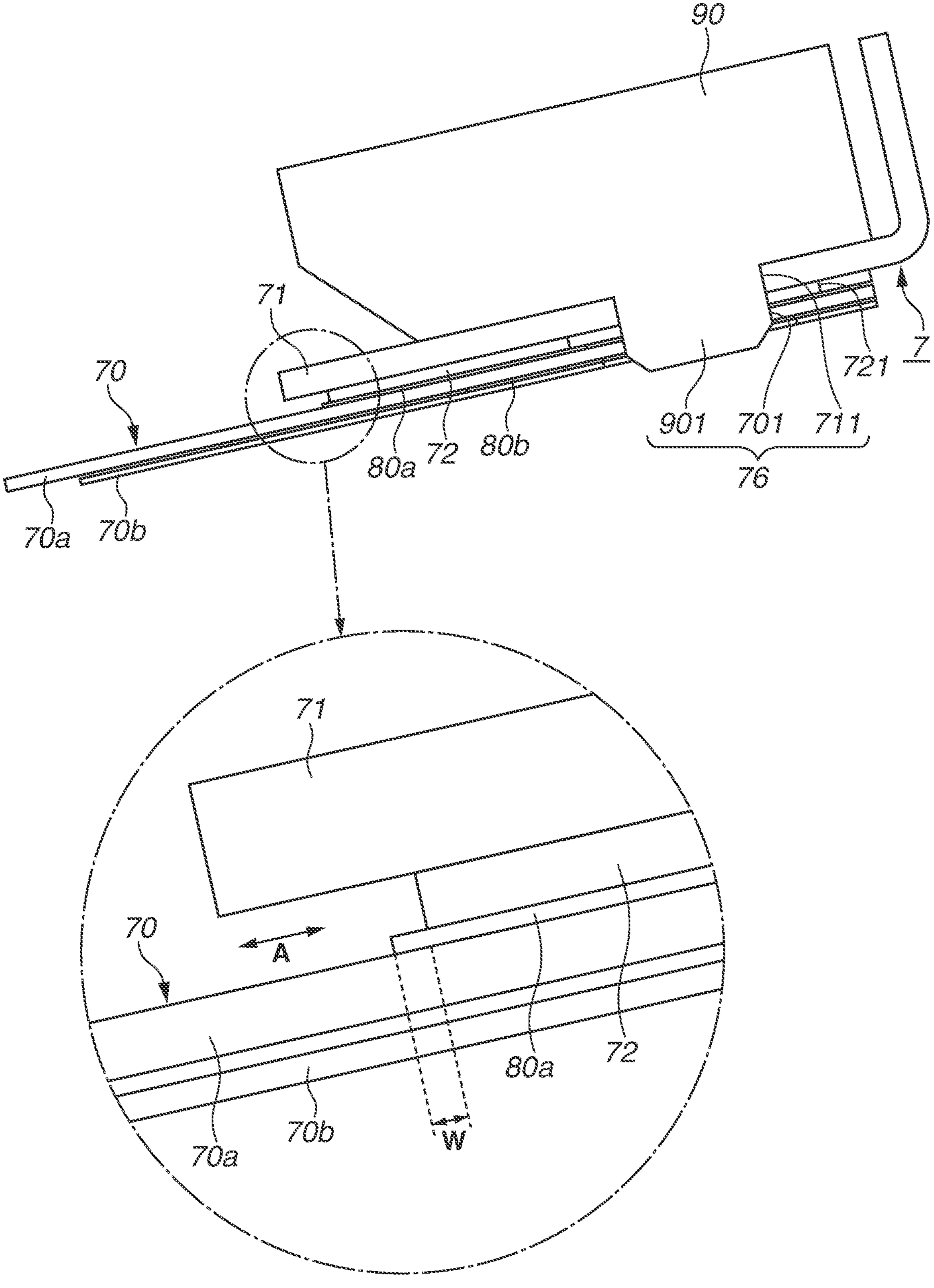
FIG. 9 is a schematic sectional view illustrating another example of the pressing member positioning structure.
Figure 10A:
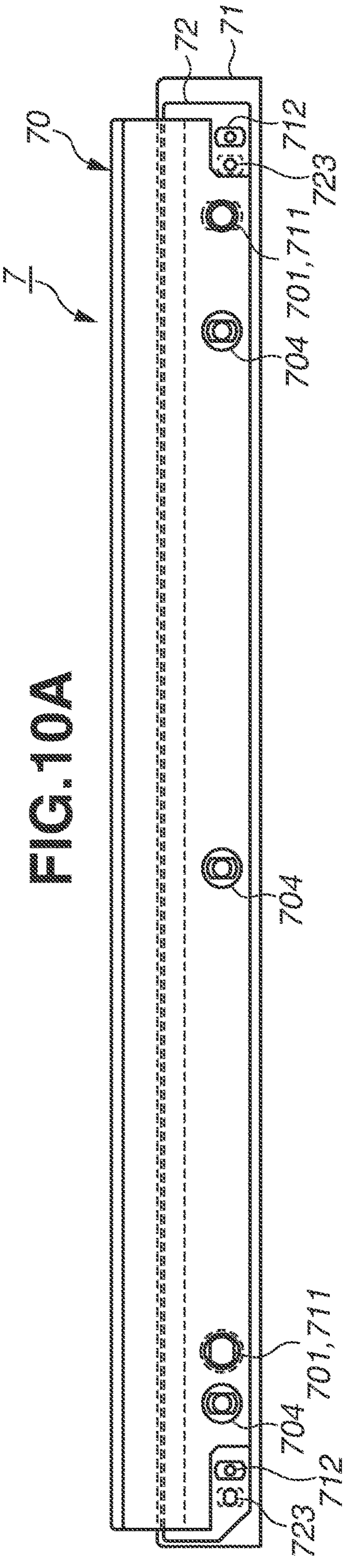
FIGS. 10A and 10B are schematic plan views each illustrating an example of the pressing member positioning structure.
Figure 10B:
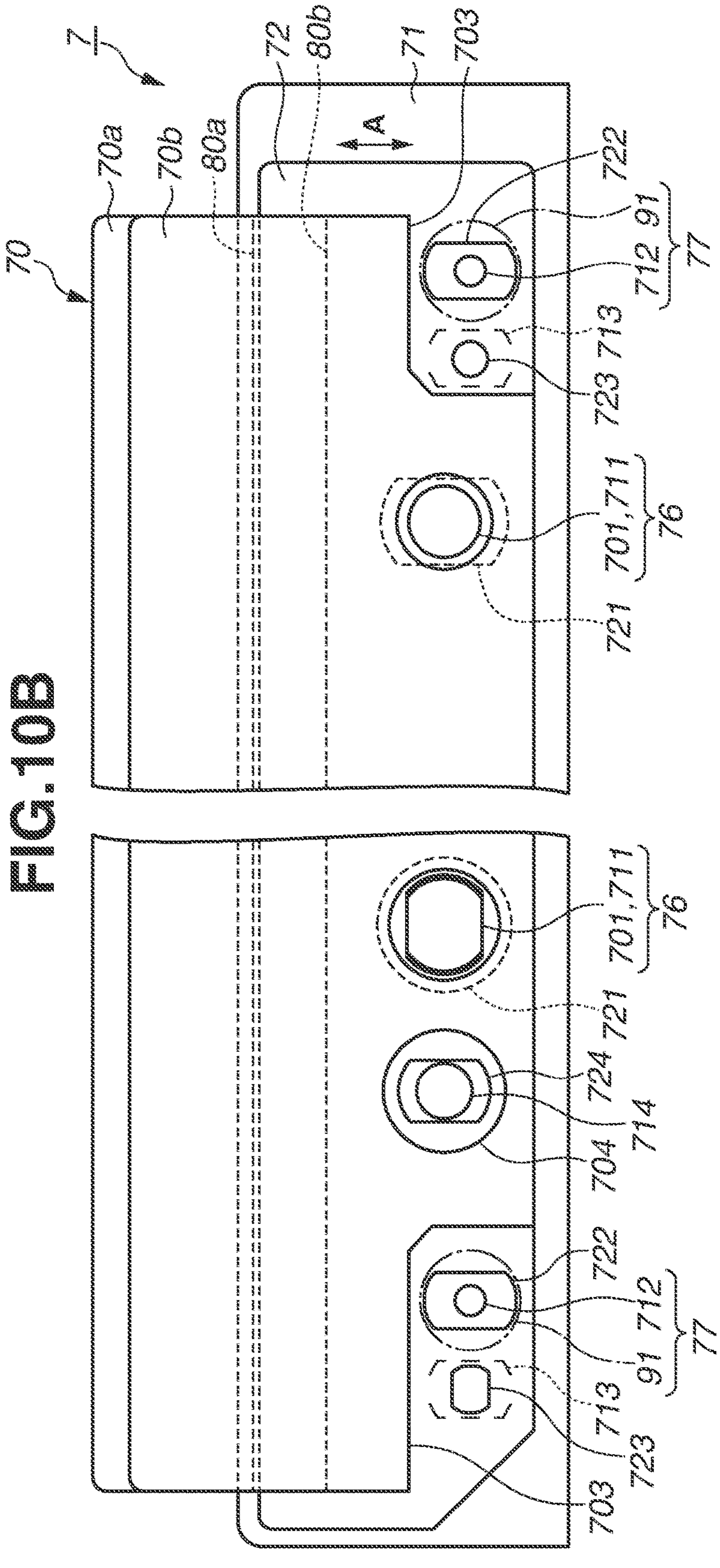

FIG. 9 is a schematic sectional view illustrating the pressing member unit 7 including the pressing member 70, a support member 71, and an adjustment member 72 according to the present exemplary embodiment. The schematic sectional view illustrates a section substantially orthogonal to the rotational axis direction of an inner secondary transfer roller 32. FIGS. 10A and 10B are plan views each illustrating the pressing member unit 7 according to the present exemplary embodiment as viewed from the pressing member 70. FIG. 10A illustrates the entire pressing member unit 7. FIG. 10B is a partially enlarged view illustrating portions in the vicinity of both end portions in the longitudinal direction of the pressing member unit 7.

Referring to FIG. 9, in the present exemplary embodiment, the pressing member 70, the adjustment member 72, and the support member 71 are adjusted during assembly and fixed as described in detail below, and are fixed to, for example, a mounting member 90 provided on an intermediate transfer belt unit 30 (or an apparatus body 110) with screws or the like. In the present exemplary embodiment, the pressing member 70 is provided with a positioning hole 701 for positioning the pressing member 70 with respect to the support member 71. In the present exemplary embodiment, the support member 71 is also provided with a positioning hole 711 for positioning the pressing member 70 with respect to the support member 71. In contrast, a mounting member 90 is provided with a positioning pin (positioning protrusion) 901 that fits the positioning holes 701 and 711. A positioning portion 76 including the positioning holes 701, 711 and the positioning pin 901 positions the pressing member 70 with respect to the support member 71 in the direction along the movement direction of the intermediate transfer belt 31. The adjustment member 72 is provided with an escape hole 721 that forms an escape portion and allows the positioning pin 901 of the positioning portion 76 to escape in the direction along the movement direction of the intermediate transfer belt 31, or the adjustment direction (direction indicated by an arrow A) of the adjustment member 72. The escape hole 721 is formed of, for example, a long hole elongated in the adjustment direction, or a circular hole (FIG. 10) having a diameter larger than that of the positioning holes 701 and 711 described above, so that the adjustment member 72 does not interfere with the positioning pin 901 even when the adjustment member 72 is fixed at any position within the adjustment range in the adjustment direction of the adjustment member 72.

Referring to FIGS. 10A and 10B, in the present exemplary embodiment, the support member 71 is provided with fixing holes 712 for fixing the adjustment member 72 to the support member 71 at both ends of the support member 71 in the longitudinal direction. Screws 91 are screwed such that the adjustment member 72 is fit into the fixing holes 712, thereby fixing the adjustment member 72 to the support member 71. The fixing hole 712 and the screw 91 form a fixing portion 77. The adjustment member 72 is provided with fixing portion escape holes (fixing portion insertion section) 722 that form a fixing portion escape portion and each allow the corresponding screw 91 of the fixing portion 77 to escape in the direction along the movement direction of the intermediate transfer belt 31, or the adjustment direction (direction indicated by the arrow A) of the adjustment member 72. Each fixing portion escape hole 722 is formed of, for example, a long hole elongated in the adjustment direction such that the adjustment member 72 does not interfere with the corresponding screw 91 of the fixing portion 77 even when the adjustment member 72 is fixed at any position within the adjustment range in the adjustment direction of the adjustment member 72.

In the present exemplary embodiment, the adjustment member 72 is provided with adjustment positioning holes 723 for positioning the adjustment member 72 with respect to a movement mechanism 202 (FIG. 11) provided in a jig 200 (FIG. 11) used to assemble a pressing member unit 7 to be described below at both end portions in the longitudinal direction of the adjustment member 72. In contrast, the support member 71 is provided with adjustment escape holes 713 that respectively allow adjustment pins 221 (FIG. 11) of the movement mechanism 202 that fit the adjustment positioning holes 723 to escape. Each adjustment escape hole 713 is formed of, for example, a long hole elongated in the adjustment direction such that each adjustment pin 221 does not interfere with the corresponding adjustment pin 221 even when the adjustment pin 221 is moved to any position within the adjustment range in the adjustment direction of the adjustment member 72. Further, in the present exemplary embodiment, the pressing member 70 is provided with notches 703 at both end portions in the longitudinal direction of the pressing member 70 such that the adjustment member 72 does not interfere with the corresponding fixing portion 77 and the corresponding adjustment pin 221.

The pressing member 70, the support member 71, and the adjustment member 72 are each provided with unit fixing holes 704, 714, and 724 through which screws for fixing the pressing member unit 7 to the mounting member 90 are inserted. The unit fixing hole 724 provided in the adjustment member 72 is formed of, for example, a long hole elongated in the adjustment direction such that the adjustment member 72 does not interfere with the corresponding screw even when the adjustment member 72 is fixed at any position within the adjustment range in the adjustment direction of the adjustment member 72.

Figure 11:
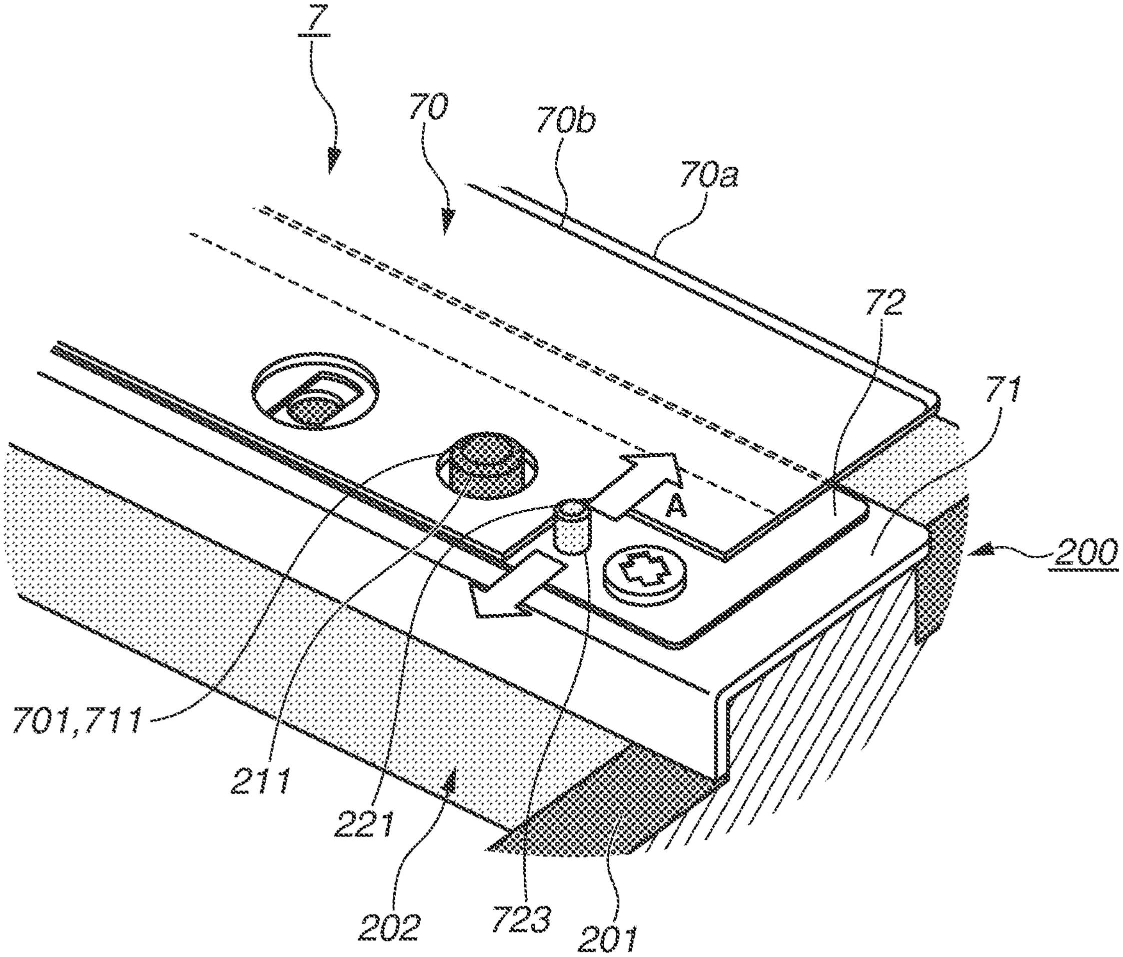
FIG. 11 is a schematic perspective view illustrating an example of an assembly method.

A method for assembling the pressing member unit 7 according to the present exemplary embodiment having the structure as described above will be described. FIG. 11 is a schematic perspective view illustrating a state where the pressing member unit 7 is temporarily fixed to the jig 200 that is used to assemble the pressing member unit 7 according to the present exemplary embodiment. While FIG. 11 illustrates only the structure at one end in the longitudinal direction of the pressing member unit 7, the structure at the other end of the pressing member unit 7 is similar to the structure at the one end of the pressing member unit 7. The jig 200 includes a mounting portion 201 formed like the mounting member 90 descried above, and the movement mechanism 202 that is configured to be movable (slidably movable) along the adjustment direction of the adjustment member 72 with respect to the mounting portion 201. The mounting portion 201 is provided with a jig positioning pin 211 for positioning the pressing member 70 and the support member 71.

As described above, the adjustment member 72 located between the pressing member 70 and the support member 71 is formed such that the mounting position can be adjusted in the direction (direction indicated by the arrow A) along the movement direction of the intermediate transfer belt 31 with respect to the pressing member 70 and the support member 71. During assembly of the pressing member unit 7, the jig positioning pin 211 of the jig 200 is used to position and temporarily fix the pressing member 70 with respect to the support member 71. Assume that the first sheet 70*a* and the second sheet 70*b* of the pressing member 70 are fixed in advance with a double-sided tape. Also, assume that the adjustment member 72 is located on the support member 71 such that the adjustment pin 221 of the movement mechanism 202 fits the corresponding adjustment positioning hole 723 described above. Next, the adjustment member 72 is located at a certain position in the adjustment direction (direction indicated by the arrow A), and the adjustment member 72 is temporarily fixed to the support member 71. In this state, the pressing member unit 7 is moved together with the jig 200 so that the pressing member 70 is pressed against a load cell.

The urging force F of the pressing member 70 when the deflection amount of the pressing member 70 is set to a predetermined deflection amount is actually measured by the load cell. Thus, the adjustment amount ΔL of the free length L described in the first exemplary embodiment can be obtained. Next, the temporal fixation of the adjustment member 72 to the support member 71 is released, and the adjustment member 72 is moved by the movement mechanism 202 of the jig 200 so that the free length L satisfies L+ΔL. In other words, the adjustment member 72 is moved in the adjustment direction (direction indicated by the arrow A) relative to the pressing member 70 and the support member 71, which are positioned relative to each other, so that the free length L satisfies L+ΔL. After the adjustment, the adjustment member 72 is fixed to the support member 71 with screws. Thereafter, the pressing member 70 that is temporarily dismounted from the adjustment member 72 is fixed with a double-sided tape while positioning the pressing member 70 with respect to the support member 71 using the jig positioning pin 211 of the jig 200. Thus, the pressing member 70 is positioned with respect to the support member 71, and the pressing member unit 7 is assembled in a state where the free length L of the pressing member 70 is adjusted to an optimum value.

As illustrated in the enlarged view of FIG. 9, the first sheet 70*a* of the pressing member 70 is attached and fixed to the adjustment member 72 by a double-sided tape 80*a*. In the present exemplary embodiment, at least the distal end of the adjustment member 72 at the distal end side of the pressing member 70 in the direction along the movement direction of the intermediate transfer belt 31 and the first sheet 70*a* of the pressing member 70 are attached with the double-sided tape 80*a*. At least the distal end of the adjustment member 72 and the first sheet 70*a* of the pressing member 70 are preferably attached over substantially the entire area in the longitudinal direction of the pressing member 70, but instead can be attached in a part of the entire area. Particularly, in the present exemplary embodiment, the double-sided tape 80*a* is elongated such that the double-sided tape 80*a* protrudes more than the distal end of the adjustment member 72 at the distal end side of the pressing member 70 by a length W in the direction along the movement direction of the intermediate transfer belt 31. In the longitudinal direction of the pressing member 70, the double-sided tape 80*a* is preferably provided over substantially the entire area, but instead can be provided on a part of the area. In the present exemplary embodiment, the double-sided tape 80*a* is provided on the entire area. This is because the pressing member 70 and the adjustment member 72 may not be brought into contact with each other in some cases if the double-sided tape 80*a* is shorter than the length of the adjustment member 72, which may make it difficult to obtain the effect of adjusting the free length L of the pressing member 70 as described above. Like in the present exemplary embodiment, the double-sided tape 80*a* is set to be longer than the distal end of the adjustment member 72 at the distal end side of the pressing member 70, thereby making it possible to prevent from failing to bring the pressing member 70 and the adjustment member 72 into contact with each other. The same advantageous effects can be obtained also when, for example, an adhesive is used as the fixing unit.

The first sheet 70*a* and the second sheet 70*b* of the pressing member 70 are attached and fixed with a double-sided tape 80*b*. In the present exemplary embodiment, the double-sided tape 80*b* allows the second sheet 70*b* to be attached to the first sheet 70*a* in an area that does not overlap the free length L of the pressing member 70 (first sheet 70*a*).

In the present exemplary embodiment, like in the first exemplary embodiment, the pressing member 70 is configured such that the pressing member 70 is not in contact with the support member 71 when the pressing member 70 is deformed.

As described above, in the present exemplary embodiment, the image forming apparatus 100 includes the positioning portion 76 that positions the pressing member 70 with respect to the support member 71 in the direction along the movement direction of the intermediate transfer belt 31. The adjustment member 72 is provided with an escape portion (the escape hole 721) that allows the positioning portion 76 to escape in the direction along the movement direction of the intermediate transfer belt 31. In the present exemplary embodiment, the positioning portion 76 includes the positioning holes 701 and 711 that are provided in the pressing member 70 and the support member 71, respectively. The positioning pin 901 provided on the mounting member 90 on which the support member 71 is mounted fits the positioning holes 701 and 711. In the present exemplary embodiment, the image forming apparatus 100 includes the fixing portion 77 that fixes the adjustment member 72 to the support member 71. The adjustment member 72 is provided with the fixing portion escape portions 722 that allow the fixing portion 77 to escape in the direction along the movement direction of the intermediate transfer belt 31. In the present exemplary embodiment, the image forming apparatus 100 also includes a fixing member (double-sided tape 80*a*) that allows the pressing member 70 to be attached to the distal end of the adjustment member 72 at the distal end side of the pressing member 70 in the direction along the movement direction of the intermediate transfer belt 31. In the present exemplary embodiment, the fixing member protrudes more than the distal end of the adjustment member 72 at the distal end side of the pressing member 70 in the direction along the movement direction of the intermediate transfer belt 31. The fixing member can be formed of a double-sided tape or an adhesive.

As described above, the structure according to the present exemplary embodiment can also obtain the same advantageous effects as those of the first exemplary embodiment. The structure according to the present exemplary embodiment facilitates the adjustment of the pressing member unit 7 during assembly.

While specific exemplary embodiments of the present disclosure are described above, the present disclosure is not limited to the above-described exemplary embodiments.

In the above-described exemplary embodiments, an outer roller that is in direct contact with the outer circumferential surface of the intermediate transfer belt 31 is used as the outer member that forms the secondary transfer portion together with an inner roller serving as the inner member. Alternatively, an outer roller and a secondary transfer belt stretched around the outer roller and other rollers can be used as the outer member. For example, the outer roller can be brought into contact with the outer circumferential surface of the intermediate transfer belt 31 via the secondary transfer belt. In such a structure, the inner roller in contact with the inner circumferential surface of the intermediate transfer belt 31 and the outer roller in contact with the inner circumferential surface of the secondary transfer belt nip the intermediate transfer belt 31 and the secondary transfer belt, thereby forming the secondary transfer portion N2. In such a case, a contact portion between the intermediate transfer belt 31 and the secondary transfer belt corresponds to the secondary transfer portion (secondary transfer nip) N2.

While the above-described exemplary embodiments illustrate an example where the intermediate transfer belt 31 is used as a belt-like image carrying member, the present disclosure can be applied to any image carrying member, as long as the image carrying member is formed of an endless belt that conveys a toner image carried at the image forming position. Examples of the belt-like image carrying member include not only the intermediate transfer belt 31 according to the exemplary embodiments described above, but also a photosensitive member belt and an electrostatic recording dielectric belt.

The present disclosure can also be implemented by other exemplary embodiments in which some or all of the components according to the above-described exemplary embodiments are replaced with the alternative components. The present disclosure can therefore be applied to any image forming apparatus using a belt-like image carrying member, regardless of the tandem type/one-drum type, the charging method, the electrostatic image forming method, the developing method, the transfer method, and the fixing method. While the above-described exemplary embodiments mainly describe the principal portion related to the formation and transfer of a toner image, the present disclosure can be carried out in various applications, such as printers, various printing machines, copying machines, facsimile (FAX) machines, and multi-function peripherals, in addition to the required devices, equipment, and housing structure.

According to an aspect of the present invention, it is possible to optimize the deformation amount of a belt due to pressing of a pressing member even when the thickness or Young's modulus of the material of a pressing member varies.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-071198, filed Apr. 22, 2022, which is hereby incorporated by reference herein in its entirety.

What is claimed is:

1. An image forming apparatus comprising:

an image forming unit configured to form a toner image;

a belt that is rotatable and endless and configured to receive transfer of the toner image formed by the image forming unit;

a plurality of tension rollers around which the belt is stretched, wherein the plurality of tension rollers includes an inner roller and an upstream roller where the inner roller forms a transfer portion to transfer the toner image from the belt onto a recording material and the upstream roller is located adjacent to the inner roller at an upstream of the inner roller in a rotational direction of the belt;

a pressing member having a tip and located at the upstream of the inner roller and at a downstream of the upstream roller in the rotational direction of the belt, wherein the pressing member is configured to be brought into contact with an inner circumferential surface of the belt and, to press the belt and extending along a longitudinal direction corresponding to a width direction of the belt, and the tip of the pressing member at the downstream in a movement direction of the belt is configured to be brought into contact with the inner circumferential surface of the belt;

a support member configured to support the pressing member; and an adjustment member provided between the pressing member and the support member, wherein the adjustment member is fixed to the support member such that a position with respect to the pressing member is adjustable in a short direction orthogonal to a longitudinal direction of the pressing member, and is configured to adjust a length of a protruding portion of the pressing member protruding from the adjustment member toward the downstream in the movement direction of the belt.

2. The image forming apparatus according to claim 1, further comprising a positioning portion configured to position the pressing member with respect to the support member in a direction along the movement direction of the belt, wherein the adjustment member includes an insertion section into which the positioning portion can be inserted, and the insertion section is configured to allow the positioning portion to move in the direction along the movement direction of the belt.

3. The image forming apparatus according to claim 2, wherein the positioning portion includes a positioning hole in the pressing member, and includes a positioning protrusion that is provided on the support member and fits into the positioning hole.

4. The image forming apparatus according to claim 2, wherein the positioning portion includes a positioning protrusion provided on a mounting member on which the support member is mounted, a first positioning hole provided in the pressing member to which the positioning protrusion fits, and a second positioning hole provided in the support member to which the positioning protrusion fits.

5. The image forming apparatus according to claim 1, further comprising a fixing portion configured to fix the adjustment member to the support member, wherein the adjustment member includes a fixing portion insertion section into which the fixing portion can be inserted, and the fixing portion insertion section is configured to allow the fixing portion to move in a direction along the movement direction of the belt.

6. The image forming apparatus according to claim 1, further comprising an attaching member configured to attach the adjustment member to the pressing member.

7. The image forming apparatus according to claim 6, wherein the attaching member protrudes more than a leading edge of the adjustment member at a leading edge side of the pressing member in a direction along the movement direction of the belt.

8. The image forming apparatus according to claim 6, wherein the attaching member is one of the following: a double-sided tape or an adhesive.

9. The image forming apparatus according to claim 1, wherein a thickness of the adjustment member is set such that the pressing member is not in contact with the support member in a case where the adjustment member is brought into contact with the belt and is deformed.

10. The image forming apparatus according to claim 1, wherein a thickness of the adjustment member is smaller than a thickness of the support member.

11. The image forming apparatus according to claim 1, wherein the pressing member is formed using a flexible plate-like resin member.

12. The image forming apparatus according to claim 11, wherein the pressing member further includes a plurality of plate-like members fixed together.

13. The image forming apparatus according to claim 1, wherein the adjustment member is formed using a plate-like metal member.

14. The image forming apparatus according to claim 1, wherein the support member supports the pressing member on an opposite side of the belt with respect to the pressing member.

* * * * *